(12) United States Patent
Leigh

(10) Patent No.: US 11,199,671 B2
(45) Date of Patent: Dec. 14, 2021

(54) GLASS-AS-A-PLATFORM (GAAP)-BASED PHOTONIC ASSEMBLIES COMPRISING SHAPED GLASS PLATES

(71) Applicant: HEWLETT PACKARD ENTERPRISE DEVELOPMENT LP, Houston, TX (US)

(72) Inventor: Kevin B. Leigh, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/854,889

(22) Filed: Apr. 21, 2020

(65) Prior Publication Data
US 2021/0325618 A1  Oct. 21, 2021

(51) Int. Cl.
*G02B 6/42* (2006.01)
*G02B 6/12* (2006.01)

(52) U.S. Cl.
CPC ........... *G02B 6/4287* (2013.01); *G02B 6/428* (2013.01); *G02B 6/4232* (2013.01); *G02B 6/4249* (2013.01); *G02B 2006/12038* (2013.01)

(58) Field of Classification Search
CPC .. G02B 6/4232; G02B 6/4287; G02B 6/4228; G02B 6/4249
USPC .......................................................... 385/14
See application file for complete search history.

(56) References Cited

U.S. PATENT DOCUMENTS

| | | | | |
|---|---|---|---|---|
| 3,936,143 A | * | 2/1976 | Sato | G02B 6/3843 385/67 |
| 4,713,538 A | * | 12/1987 | Theocharous | G01D 5/268 250/227.23 |
| 5,412,748 A | * | 5/1995 | Furuyama | G02B 6/3839 257/98 |
| 5,416,861 A | * | 5/1995 | Koh | G02B 6/12007 385/14 |
| 5,463,710 A | * | 10/1995 | Filgas | G02B 6/4225 385/44 |
| 5,467,419 A | * | 11/1995 | Roff | G02B 6/32 385/92 |

(Continued)

OTHER PUBLICATIONS

Carroll, L. et al.; "Transforming Silicon Photonic Integrated Circuits into Photonic Devices"; Applied Sciences; Dec. 15, 2016; 21 pages; MDPI; Switzerland.

*Primary Examiner* — Kaveh C Kianni
(74) *Attorney, Agent, or Firm* — Sheppard Mullin Richter & Hampton LLP

(57) ABSTRACT

Glass-as-a-Platform (GaaP) assemblies are provided. Embodiments of the GaaP assembly comprise a first glass plate and a second glass plate, each disposed under one or more switch ASICs and one or more opto-electronic devices co-packaged on the same substrate. Each glass plate includes a plurality of waveguides. The co-packaged substrate is disposed on top of one or more of the first glass plate and second glass plate, the first glass plate configured to couple to one or more opto-electronic devices and the second glass plate configured to couple to one or more other opto-electronic devices. A faceplate interface end of each glass plate is configured to connect to one or more optical cable connectors. The glass plates are configured to route optical signals to and from one or more opto-electronic devices and one or more optical cable connectors through the one or more waveguides and openings in the co-packaged substrate.

12 Claims, 14 Drawing Sheets

(56) References Cited

U.S. PATENT DOCUMENTS

| | | | | |
|---|---|---|---|---|
| 5,676,142 A * | 10/1997 | Miwa | A61B 5/0091 | 600/309 |
| 5,764,400 A * | 6/1998 | Itou | G02F 1/225 | 359/245 |
| 6,061,374 A * | 5/2000 | Nightingale | H01S 5/02208 | 372/50.21 |
| 6,087,194 A * | 7/2000 | Matsukura | H01L 31/0203 | 438/25 |
| 6,138,046 A * | 10/2000 | Dalton | A61N 5/0601 | 356/300 |
| 6,241,399 B1 * | 6/2001 | Nobuhara | G02B 6/30 | 385/81 |
| 6,477,286 B1 * | 11/2002 | Ouchi | G02B 6/10 | 257/433 |
| 6,487,327 B1 * | 11/2002 | Mock | G02B 6/3807 | 385/12 |
| 6,690,845 B1 * | 2/2004 | Yoshimura | G02B 6/12002 | 257/E23.01 |
| 6,908,779 B2 * | 6/2005 | Ogawa | G02B 6/423 | 438/27 |
| 7,088,880 B1 * | 8/2006 | Gershman | G01M 11/37 | 385/12 |
| 7,826,043 B1 * | 11/2010 | Urban | H04B 10/0771 | 356/73.1 |
| 9,472,710 B1 | 10/2016 | Gates et al. | | |
| 10,459,160 B2 | 10/2019 | Brusberg | | |
| 2004/0109627 A1 * | 6/2004 | Kim | G02B 6/43 | 385/14 |
| 2004/0109628 A1 * | 6/2004 | Kim | G02B 6/3636 | 385/14 |
| 2004/0136099 A1 * | 7/2004 | Kim | G02B 6/43 | 359/824 |
| 2004/0223703 A1 * | 11/2004 | Miyamae | G02B 6/4212 | 385/88 |
| 2005/0020926 A1 * | 1/2005 | Wiklof | G02B 23/24 | 600/476 |
| 2005/0046011 A1 * | 3/2005 | Chen | H05K 1/0274 | 257/705 |
| 2005/0063651 A1 * | 3/2005 | Hamasaki | G02B 6/423 | 385/100 |
| 2005/0201661 A1 * | 9/2005 | Loock | G01J 3/0218 | 385/12 |
| 2006/0013532 A1 * | 1/2006 | Wan | G01M 11/35 | 385/31 |
| 2006/0147158 A1 * | 7/2006 | Sato | G02B 6/4204 | 385/78 |
| 2006/0264059 A1 * | 11/2006 | Kobayashi | H01L 21/3146 | 438/758 |
| 2007/0123776 A1 * | 5/2007 | Aharoni | G10K 15/046 | 600/437 |
| 2010/0006784 A1 * | 1/2010 | Mack | G02B 6/43 | 250/551 |
| 2010/0008676 A1 * | 1/2010 | Kojima | G02B 6/424 | 398/141 |
| 2010/0329604 A1 * | 12/2010 | Kojima | G02B 6/2852 | 385/31 |
| 2012/0224168 A1 * | 9/2012 | Hirai | H04B 10/071 | 356/73.1 |
| 2012/0248078 A1 * | 10/2012 | Zediker | E21B 44/00 | 219/121.67 |
| 2015/0103336 A1 * | 4/2015 | Rolston | G01J 1/0425 | 356/73.1 |
| 2015/0308863 A1 * | 10/2015 | Chen | G01D 5/268 | 385/12 |
| 2015/0341112 A1 * | 11/2015 | Suzuki | H04B 10/0799 | 398/25 |
| 2016/0062063 A1 * | 3/2016 | Ogura | G02B 6/4292 | 385/14 |
| 2016/0154193 A1 * | 6/2016 | Brukilacchio | G02B 21/16 | 315/151 |
| 2016/0258839 A1 * | 9/2016 | Froggatt | G01M 11/3172 | |
| 2016/0266322 A1 * | 9/2016 | Epitaux | G02B 6/138 | |
| 2016/0327749 A1 * | 11/2016 | Jiang | C23C 14/542 | |
| 2018/0246286 A1 | 8/2018 | Lohse et al. | | |
| 2018/0335583 A1 | 11/2018 | Jou et al. | | |
| 2018/0335586 A1 * | 11/2018 | Jou | G02B 6/4212 | |
| 2019/0033542 A1 * | 1/2019 | Epitaux | G02B 6/4246 | |
| 2020/0378865 A1 * | 12/2020 | Gnausch | H04B 10/803 | |

\* cited by examiner

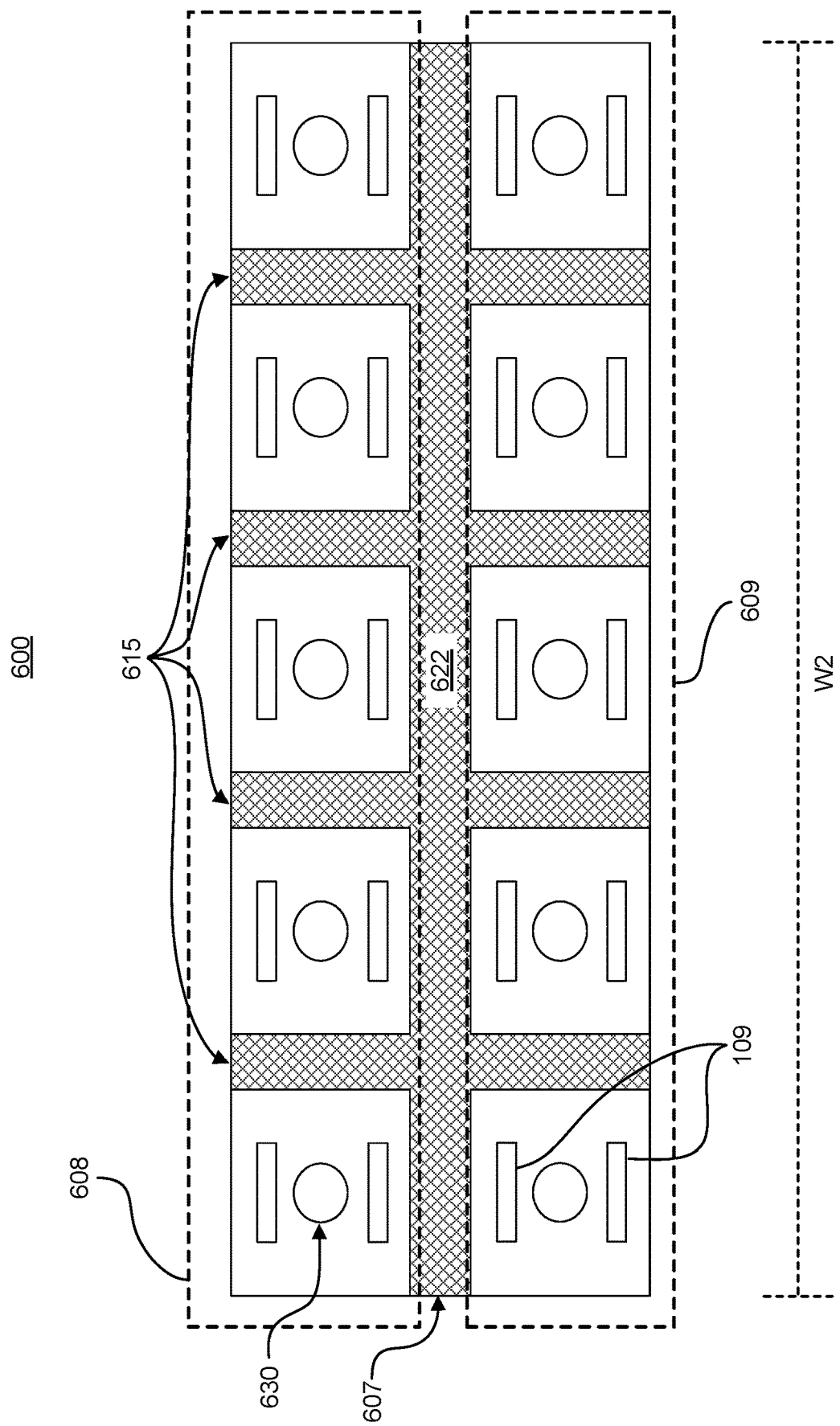

GLASS-AS-A-PLATFORM (GAAP)-BASED PHOTONIC ASSEMBLIES COMPRISING SHAPED GLASS PLATES

DESCRIPTION OF RELATED ART

Optical communication technology is used in some computing networks to increase the speed and overall bandwidth for communication between different networking devices (e.g., server device to a network router) where distances are too long for electrical communication technologies. The optical signals received by such devices are generally converted into electrical signals at the faceplate and routed through the networking device over electrical traces. Optics are increasingly being integrated into networking devices.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 6B is a front view of the glass slab of the example GaaP assembly of FIG. 6A in accordance with embodiments of the technology disclosed herein.

Figure 1A:
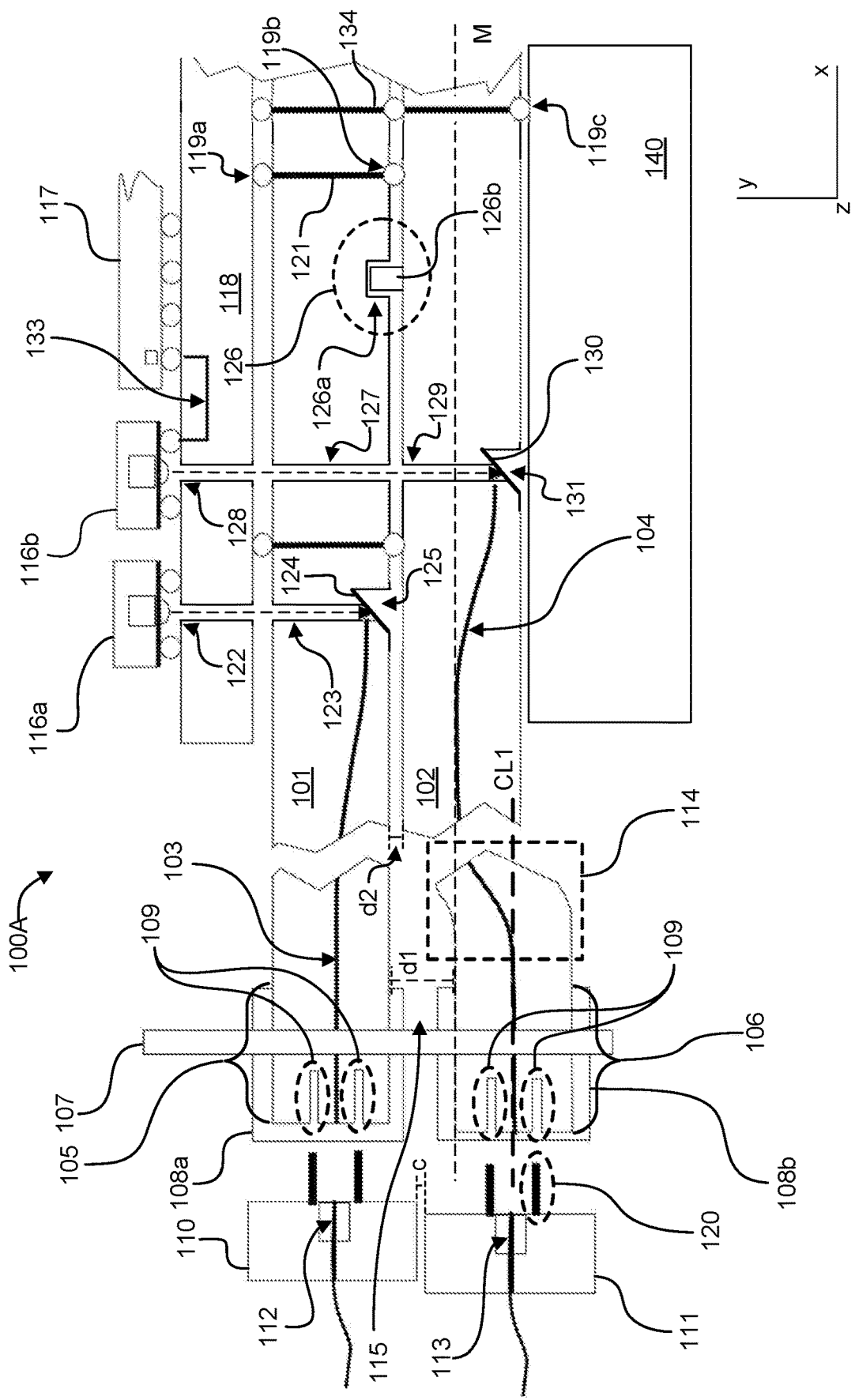
FIG. 1A is a cross-sectional view of an example Glass-as-a-Platform (GaaP) assembly in accordance with embodiments of the technology disclosed herein.

The figures are not exhaustive and do not limit the present disclosure to the precise form disclosed.

DETAILED DESCRIPTION

Optics has traditionally been integrated into computing devices in a modular fashion. Optical transceivers and other optical components generally designed as pluggable modules (e.g., quad small form-factor pluggable (QSFP) modules) to provide a conversion point between electrical and optical signals on the device's faceplate. Although ubiquitous, pluggable optical modules are generally inefficient in cost, electrical signal integrity, thermal management, module management, printed circuit board (PCB) area utilization, faceplate area utilization, and optical cable management. Moreover, utilizing a pluggable module increases the number of connections required to move the signal from the optical cable, through the optical module, to the on-board electronics of the ASIC (application specific integrated circuit). Each pluggable module can support only a few number of transceiver lanes disposed on a paddle board within the module, limiting the density of the system. In some devices, one or more intermediate boards are required to interface the pluggable module with the system board, such as line cards. The intermediate boards can provide one or more cages configured to accept one or more types of pluggable modules to address different application needs. This increases the cost of the system, as well as the complexity due to the higher number of boards and connections, including increasing the space required in the interior device.

To reduce the congestion on the faceplate due to pluggable modules, some systems utilize mid-board optics (MBOs). MBOs are modules disposed on the system board to move the I/O connection from the faceplate to the system PCB. MBOs can be used to reduce faceplate congestion, by moving the optical transceivers on the same PCB as the switch ASIC and mounting only the optical receptacle connectors on the switch system faceplate, less area on the faceplate is required while increasing the number of connections available. Although MBOs are a different package than pluggable modules, MBOs still utilize the same electronics as pluggable modules for driving/receiving electrical signals to/from the switch ASIC. Essentially, MBOs allow the optical transceivers to be located closer to switch ASICs to reduce the length of the electrical traces between the two. However, the optical transceivers and switch ASICs still need to communicate via the PCB on which both are disposed, resulting in no significant reduction in power consumption or the heat generated by the optical transceivers and the switch ASICs. Moreover, MBOs require complex designs, having to account for different physical heights and high/fluctuating thermal loads of the components. This makes it difficult to design efficient methods to cool the components and complicates fiber management for the optical transceivers, resulting in an expensive system.

Recently, co-packaging of opto-electronic devices, such as lasers and/or photodetectors, with network switch ASIC within the device have been proposed to reduce power consumption, less burden for intra-system electrical connectivity for high-speed signals, and implementation costs by eliminating high-power electrical interfaces between ASIC and optical transceivers. The optical source and/or sinks are disposed within the same package as the switch ASIC, enabling the signals between the optical sources and/or sinks and the ASIC to be routed over electrical traces within the same package. As an example, the electrical circuit traces may be routed on the same electrical substrate, where the substrate may be an organic substrate or a glass substrate having multiple layers with electrical traces and vias between the layers. The switch ASIC is still mounted on a system PCB for power distribution to the ASIC and for connections to system management logic. The faceplate of such devices can include the receptacles for different optical connector types (depending on the implementation), rather than requiring a separate pluggable module to be included. A fiber jumper from the interior side of the faceplate connector is used to route the optical signal to and from each optical source and/or sink within the switch ASIC package.

Although pluggable modules or MBOs are not needed, these types of co-packaged solutions rely on expensive custom chip ferrules used to couple a plurality of fiber jumpers (from different faceplate connectors) to the optical source and/or sink, increasing the expense of the system and requiring increased manual assembly. Generally, optical fiber jumpers are constructed by terminating optical ferrules on each end of an array of fibers. Each end face of multiple optical ferrules installed in the faceplate connectors may also need to be polished. Fiber lengths extending between the faceplate ferrules and the chip ferrules can vary, based on different faceplate connector positions. On the chip ferrule end of the fiber jumpers, an optical socket is needed to interface with the chip ferrule ends of the fiber jumpers in the chip ferrule. Accurate alignment of the fiber ends with the optical socket is required, including means for securely retaining the chip ferrule in the chip optical socket within this alignment. This requires increased custom design work, adding to the cost of development and construction. Moreover, a large number of optical fiber jumpers connecting the opto-electronic devices co-packaged with the switch ASIC need to be managed within the interior space of the system, resulting in larger space requirements and higher cost. Costs saved by co-packaging the optical components and switch ASIC is a trade off with higher fiber management, requiring expensive fiber shuffles and other methods of ensuring that the various fibers (including fiber jumpers) are properly routed without interfering with other components such as heat extraction devices.

Embodiments of the present disclosure provide a platform for opto-electrical communication utilizing glass plates having one or more waveguides disposed therein. This Glass-as-a-Platform (GaaP) design provides a co-packaged approach that allows both optical and electrical components to be disposed directly on glass plates to allow optical signals to be routed from a faceplate connector directly to the optical source and/or sink. Moreover, the optical source and/or sink and/or the switch ASIC die are also disposed on the glass plates. This eliminates the need for fiber jumpers from the faceplate connectors to custom optical chip ferrules to interface to optical source and/or sink. Moreover, the optical source and/or sink is optically coupled to the faceplate connector via the glass plates, eliminating the need for a complex custom chip ferrule and chip optical socket. In various embodiments, one or more of the glass plates may include a bend such that one end of the glass plate is positioned at a different height relative to the other end of the glass plate. The end of the glass plate connected to the faceplate can include on or more connector structures configured to mate with one or more types of optical cable connectors and align the fiber positions of the cable with the corresponding waveguides of the glass plate. In various embodiments, the optical cable connector may expose a fiber core of an optical fiber within each ferrule, whereas in other embodiments a lens may be disposed to align with a fiber core within each optical cable connector ferrule. In various embodiments, the one or more connector structures may be configured such that, when connected, the position of a fiber core (whether exposed or having a lens disposed) of the optical cable connector is aligned with a waveguide of the glass plate. For ease of reference, the technology disclosed herein shall be discussed with reference to embodiments having a switch ASIC, but the technology is not so limited only to use with switch ASICs. In other embodiments, the technology disclosed herein can be applicable to other types of ASICs, including but not limited to processors, accelerators, memory controllers, memory devices, among others. Moreover, the technology is also applicable to embodiments wherein multiple ASICs of the same type or a combination of different types can be utilized.

The technology disclosed herein is applicable for use with various different optical sources, including but not limited to, vertical cavity surface emitting lasers (VCSELs), edge emitting lasers, continuous-wave lasers indirectly modulated by silicon photonics modulators, among others. The technology disclosed herein is also applicable for use with a variety of optical sinks, such as photodetectors. A person of ordinary skill in the art would appreciate that the technology disclosed herein is not limited by the particular type of optical sink, modulator or laser component included, and could be used with any optical source or sink that can be packaged together on the same substrate.

For ease of reference, the technology disclosed herein shall be discussed with respect to optical sources. Although discussed with respect only to optical sources, the technology disclosed herein are not limited to use only with optical sources and should not be interpreted as so limited. A person of ordinary skill in the art would understand that the technology disclosed is applicable for use with optical sinks (e.g., photodetectors). The technology is applicable for any type of optical or photonic die, which can comprise optical transceivers (i.e., optical sources and sinks).

FIG. 1A shows a cross-sectional view of an example GaaP assembly 100A in accordance with embodiments of the technology disclosed herein. The example GaaP assembly 100A is provided for illustrative purposes only and should not be interpreted as limiting the scope of the technology disclosed herein to only the depicted example. As shown in FIG. 1A, the GaaP assembly 100A comprises an upper glass plate 101 and a lower glass plate 102. The upper glass plate 101 and the lower glass plate 102 each include one or more waveguides 103 and 104, respectively. In various embodiments, one or more of the waveguide 103, 104 are configured such that the one or more waveguides 103, 104 can optically couple with one of a plurality of optical components of a co-packaged photonics die 180 (discussed below). The waveguides 103, 104 serve to route the optical signals within the GaaP assembly 100A. In various embodiments, the waveguides 103, 104 can be created through ion exchange, ion implantation, UV irradiation, or laser writing, or any other method of disposing waveguides within glass used now or in the future.

Figure 1B:
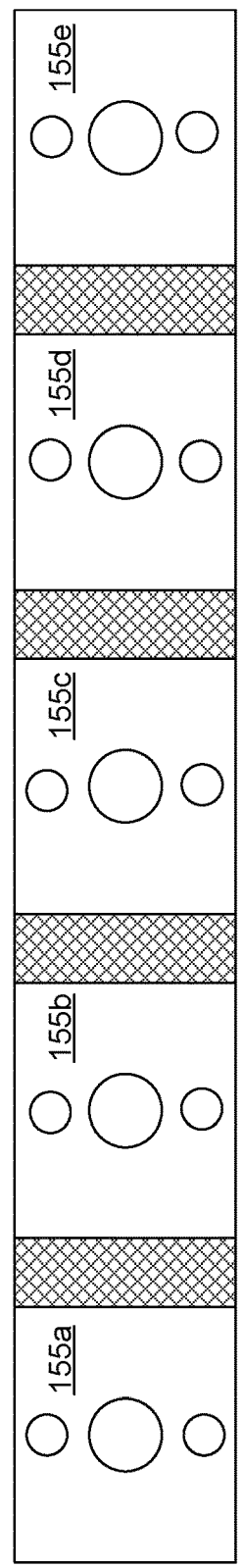
FIG. 1B is a front view of the GaaP assembly of FIG. 1A in accordance with embodiments of the technology disclosed herein.
Figure 1B:
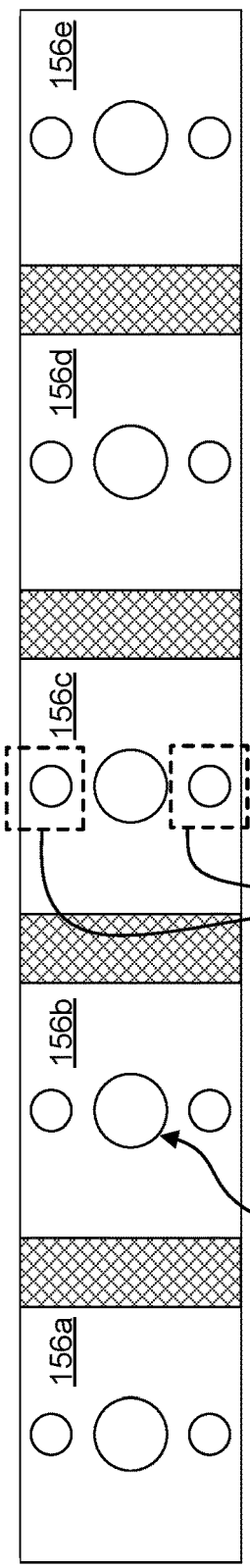
Figure 1C:
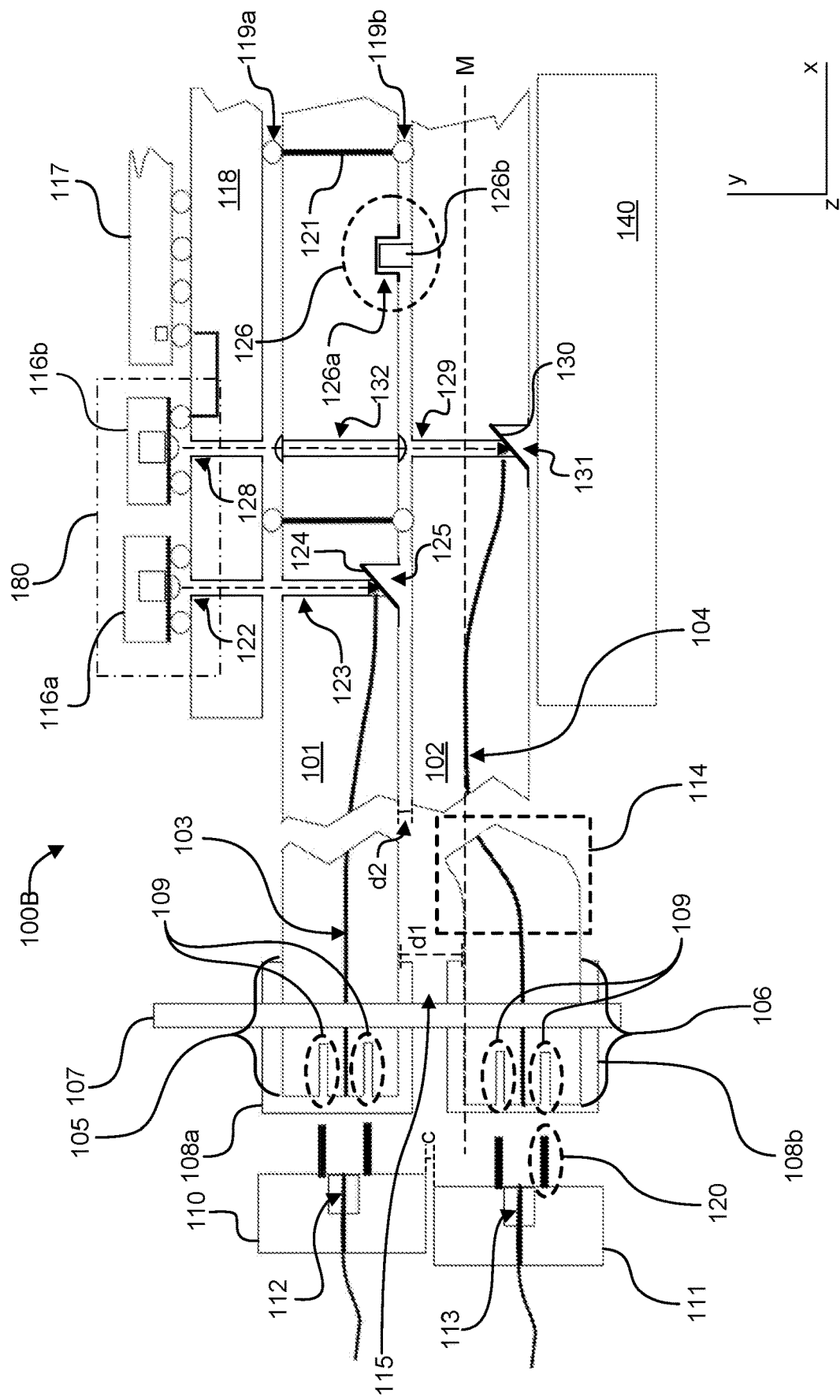
FIG. 1C is a cross-sectional view of another example GaaP assembly in accordance with embodiments of the technology disclosed herein.

Each of the glass plates 101, 102 can include a faceplate interface end 105, 106 that extends through an opening (not shown in FIG. 1A) of the faceplate 107 into a connector housing 108a, 108b, respectively, disposed on and/or in the faceplate 107. FIG. 1B illustrates a front view of the GaaP assembly 100A of FIG. 1A, showing the faceplate interface ends 105, 106. Each faceplate interface end 105, 106 comprises one or more connector ends 155a-e, 156a-e (collectively, "the connector ends 155, 156"), each including a first termination end 151 of one or more waveguides 103, 104, respectively. When an optical cable connector (e.g., optical cable connector 110 or 111 of FIG. 1A) is coupled to the GaaP assembly 100A, the optical fiber (e.g., fiber 112 or 113) of the optical cable connector is configured to be aligned with the termination end 151 of the respective connector end 155, 156 of FIG. 1B. In various embodiments, one or more connector structures 109 are disposed in each connector end 105, 106 and configured to interface with one or more corresponding connector alignment features 120 of an optical cable connector 110, 111, such that the optical cable connector is opto-mechanically coupled to the upper glass plate 101, the lower glass plate 102, or both. The form of the one or more connector structures 109 can vary depending on the type of optical cable connector 110, 111 used in the system. As shown in FIG. 1A, in various embodiments the connector structures 109 can be formed as a channel, notch, hole, or other feature formed within the connector end 105, 106, configured such that the corresponding connector alignment feature(s) 120 can be inserted. The connector structures 109 can be configured to secure the optical cable connector 110, 111 to the GaaP assembly 100A so that the optical cable connector 110, 111 remains connected to the GaaP assembly 100A. In various embodiments, the connector structures 109 can also serve to help align the position of the fiber 112, 113 with the termination end 151 of the one or more waveguides 103, 104 of the glass plates 101, 102. In some embodiments, the connector structures 109 can comprise one or more protrusions or other extensions from a surface of the connector ends 155, 156.

Each connector end 155, 156 is configured to sit within a connector housing 108a, 108b. The faceplate 107 comprises a side of an enclosure (not shown in FIG. 1) within which the GaaP assembly 100A is disposed. The connector ends 155, 156 extend out of the enclosure such that the connector ends 155, 156 are external to the enclosure and accessible for optical cables to be connected. The structures 109 can be used to interface with the optical cable connector 110, 111 and assist in aligning the fiber 112, 113 with the one or more waveguides 103, 104 of the glass plates 101, 102. In various embodiments, the connector ends 155, 156 can be disposed within the same connector housing, while in other embodiments each connector end 155, 156 can be disposed within a separate connector housing (connector housings 108a and 108b as depicted in FIG. 1).

In various embodiments, one or more glass plates may include a bend such that the centerline CL1 of the faceplate interface of a glass plate is positioned above or below the mid-plane M of the glass plate. As shown in FIG. 1, the lower glass plate 102 includes a bend 114. The connector housing 108a, 108b must be positioned such that there is sufficient space on the faceplate 107 for each optical cable connector 110, 111 to couple with the respective connector housing 108a, 108b. In various embodiments, one or more glass plates may require a bend (such as bend 114) to enable the faceplate interface (e.g., faceplate interface 106) to be separated from one or more other faceplate interfaces (e.g., faceplate interface 105). In this way, a gap 115 can be formed having a distance d. The distance d can be determined based on the clearance c required for the specific optical cable connector used. Non-limiting examples of optical cable connectors that may be used include MPO parallel-fiber connectors (with various types of MT ferrules), MXC parallel-fiber connectors with lensed ferrules, LC simplex-fiber connectors, LC duplex-fiber connectors (with uni-boot or dual-boot cables), MDC duplex-fiber connectors, SN duplex-fiber connectors, CS duplex-fiber connectors, among others. The technology disclosed herein is not limited to any specific type of optical cable connector and is can be configured to work with any type of optical cable connector used now or in the future. Although depicted with the bend 114 being disposed in the lower glass plate 102, in various embodiments the upper glass plate 101 may have the bend disposed therein, while in still other embodiments both the upper glass plate 101 and the lower glass plate 102 may include a bend 114. In some embodiments, one or more glass plates may include a bend like bend 114. As depicted, the bend 114 is used to position the faceplate interface 106 below a mid-plane M of the lower glass plate 102. In various embodiments, the bend 114 can be disposed at a position between portion of the lower glass plate 102 disposed under the electronic substrate 118 and the faceplate interface 106.

Glass is commonly used as a substrate in current optical components, similar to how organic and non-organic materials are used as substrates in electronic component packages. In such embodiments, glass is being used as dielectric layers between electrical circuit traces and vias to connect small electronic and opto-electronic components among them and to package interface, such as solder balls or plated contact pads. Rather than using the glass merely as a substrate to electrically connect small components, the GaaP technology disclosed herein utilizes the glass material as an actual platform for both optical and electrical circuitries and components, and to provide direct optical signal interface for optical cables. In this way, the glass plates serve to reduce the amount of materials around the ASIC and other electronic components that are co-packaged with the optical sources and/or sinks. This increases the potential density of connections that can be included in the system and the number of optical sources and/or sinks that can be co-packaged with the ASIC while significantly reducing electrical interfaces between electronic and opto-electronic components. Moreover, using glass in this manner enables fiber jumpers used to interface to faceplate optical connectors to be eliminated, and thus reduces the overall system power, size and cost.

As illustrated in FIG. 1, the opto-electronic devices 116a, 116b and the switch ASIC 117 are co-packaged on the same electronic substrate 118, which is disposed on a top surface of the upper glass plate 101. By co-packaged, this disclosure means that both the switch ASIC 117 and the opto-electronic devices 116, 116b, along with the necessary electrical traces, are disposed on the same substrate (e.g., electronic substrate 118). Although depicted with the optical (e.g., opto-electronic devices 116a, 116b) and the electronic (e.g., switch ASIC 117) components as co-packaged, in various embodiments both sets of components can be disposed on separate substrates, each of which is disposed on a top surface of the upper glass plate 101. In the depicted embodiment of FIG. 1, the opto-electronic 116a, 116b comprise vertical cavity surface emitting lasers (VCSELs), which serve as an opto-electronic source in photonics. Although VCSELs are shown in the GaaP assembly 100A of FIG. 1, other types of opto-electronic sources can be used in various embodiments. In various embodiments, one or more opto-electronic sinks (not pictured in FIG. 1) can be disposed on the electronic substrate 118.

The electronic substrate 118 can be coupled to the top surface of the upper glass plate 101 using conventional means of attaching semiconductor dies. In various embodiments, one or more solder balls 119a can be used to secure the electronic substrate 118 to the top surface of the upper glass plate 101. In some embodiments, one or more of the solder balls 119a can be connected to another solder ball 119c or other conductive area (through a solder ball 119b) to provide electrical power and low-speed management electrical signals for the electrical components (e.g., switch ASIC 117). The solder balls 119a, 119b, and 119c can be connected using a conductive via 134 disposed in the glass plates 101, 102. The solder ball 119c is disposed on the system board 140. In some embodiments one or more conductive vias 134 can be included within the GaaP assembly 100A. High-speed electrical signals between the switch ASIC 117 to the one or more opto-electronic devices 116a, 116b through one or more high-speed traces 133 within the electronic substrate 118. Although only one high-speed trace 133 is shown connecting the switch ASIC 117 to the opto-electronic device 116b, this is only for simplicity in the illustrated embodiment; another high-speed trace (not shown in FIG. 1A) would connect the switch ASIC 117 to the opto-electronic device 116a and the other one or more opto-electronic devices disposed on the electronic substrate 118.

The solder balls 119a can also assist in aligning the electronic substrate 118 on the top surface of the upper glass plate 101 such that a plurality of optical openings of the electronic substrate 118 and the upper glass plate 101. Aligning of the optical openings 122, 128 of the electronic substrate 118 and the optical vias 123, 127 of the upper glass plate 101 enables the optical coupling of the light output by the opto-electronic devices 116a, 116b (in this example embodiment, VCSELs) to one or more waveguides 103 in the upper glass plate 101 without the need for a complex custom chip ferrule or any connector component because the light path is consistent between the aligned openings. As illustrated in FIG. 1, the light from the VCSEL 116a in the example embodiment is emitted (identified be the broken arrow) through the optical opening 122 and through the upper-plate optical vias 123. Although discussed with respect to solder balls 119a this should not be interpreted as limiting the scope of the disclosure to only such components.

As illustrated in FIG. 1A, the electronic substrate can comprise optical openings 122, 128. In various embodiments, each optical openings 122, 128 is associated with one of the glass plates. Optical openings 122 are associated with the upper glass plate 101 and optical openings 128 are associated with the lower glass plate 102 in the depicted embodiment. In other embodiments, the optical openings 122 can be associated with the lower glass plate 101 and the optical openings 128 can be associated with the upper glass plate 102. Each of the optical openings 122, 128 can comprise a row of openings in the electronic substrate 118 in some embodiments. One or more opto-electronic devices 116a, 116b may be disposed on the top surface of the electronic substrate 118, with the one or more of opto-electronic devices 116a are configured to optically couple to waveguides 103 disposed in the upper glass plate 101 and the one or more opto-electronic devices 116b are configured to optically couple to waveguides 104 disposed in the lower glass plate 102. The one or more opto-electronic devices 116a may be disposed on the electronic substrate 118 in a row extending in the z-direction (i.e., into the page). Each opto-electronic device 116a can be associated with one or more optical openings 122.

As stated above, the optical openings 122, 128 are aligned with one or more optical vias 123, 127 disposed in the upper glass plate 101. In various embodiments, the one or more optical vias 123, 127 can comprise a plurality of instances vias disposed in the upper glass plate 101 along the horizontal width of the upper glass plate 101, beneath the electronic substrate 118. In various embodiments, the upper glass plate 101 comprises a plurality of upper-plate optical vias 123 and a plurality of pass-through optical vias 127. The upper glass optical vias 123 can be an opening extending from the top surface of the upper glass plate 101 towards the interior of the upper glass plate 101 to the depth of the one or more waveguides 103, and are configured to enable the one or more waveguides 103 to optically couple with the one or more opto-electronic devices 116a. In various embodiments, one or more waveguides 103 can terminate at each of the upper-plate optical vias 123. The pass-through optical vias 127 are configured to enable the waveguides 104 to optically couple with the one or more opto-electronic devices 116b, and extend from the top surface of the upper glass plate 101 through the bottom surface of the upper glass plate 101 to create a hole in the upper glass plate 101. In other examples, a pass-through optical via 127 may be replaced with a vertical waveguide 132 having lenses on top and bottom end of the waveguide, as illustrated in the example GaaP assembly 100B of FIG. 1C. As shown, the GaaP assembly 100B includes the same or similar elements as those of the GaaP assembly 100A of FIG. 1A.

Referring to FIG. 1A, to optically couple the one or more waveguides 103 of the upper glass plate 101 with corresponding one or more opto-electronic devices 116a, a directional mirror 124 may be disposed in each of the one or more upper glass optical vias 123. The directional mirror 124 is configured to optically couple light from the VCSEL 116a into one or more of the waveguides 103. In various embodiments, the directional mirror 124 is formed within each upper-plate optical via 123 through a void 125 on a bottom surface of the upper glass plate 101, the void 125 being positioned underneath each respective upper-plate optical via 123. The depth of the void 125 drilled through the bottom surface of the upper glass plate 101 is such that the directional mirror 124 is aligned to couple the light emitted from the associated VCSEL 116a to the intended one or more waveguides 103 terminating at the associated upper-plate optical via 123. As depicted in FIG. 1A, the void 125 may be asymmetrically drilled, wherein one wall of the void 125 is higher than the opposite side of the void 125. For ease of reference, the technology disclosed herein is discussed with respect to the use of turning mirrors to couple light to and from the optical fibers of the cable and the co-packaged opto-electronic devices and switch ASIC. However, the technology disclosed herein are not limited only to the use of directional mirrors for coupling, and is applicable with the use of other coupling means, including but not limited to lens, grating couplers, etc. Nothing in this disclosure should be interpreted as limiting the scope of the technology to only embodiments utilizing a directional mirror. In some embodiments, more than one type of coupling device can be used in the same GaaP assembly, wherein at least one glass plate is configured to couple light using a different coupling device than another glass plate.

Because of the stacked configuration of the glass plates depicted in FIG. 1A, the alignment of the upper glass plate 101 and the lower glass plate 102 is also important to ensure that the optical coupling between the one or more opto-electronic devices 116b and the lower glass plate 102 is possible. In various embodiments, solder balls 119b can be disposed on the bottom surface of the upper glass plate 101. In various embodiments, one or more solder balls 119b can be disposed on the bottom side of the upper glass plate opposite and parallel to a corresponding solder ball 119a on the top surface of the upper glass plate 101. In some embodiments, each pair of solder balls 119a, 119b can be aligned by using a substrate via 121. In some embodiments, the substrate via 121 can comprise a conductive material to enable electrical signals (e.g., power, management, etc.) to pass between the solder balls 119a, 119b and another solder ball 119c disposed on the system board 140, similar to the conductive power via 134, while in other embodiments the substrate via 121 can comprise a non-conductive material. Disposing the solder balls 119a, 119b on opposite sides of the substrate via 121 assists in ensuring that the one or more pass-through optical vias 127 and optical openings 128 are aligned with the lower-plate optical vias 129 and, in some embodiments, coupling the lower glass plate 102 with the upper glass plate 101. In some embodiments, one or more additional alignment features may be disposed on the upper glass plate 101, the lower glass plate 102, or a combination thereof to assist in aligning the optical vias 123 and 127, 129 with corresponding openings 122 and 128. In the depicted example GaaP assembly 100A of FIG. 1, a pin-and-socket structure 126 is used as an additional alignment feature. The pin-and-socket structure 126 comprises a socket 126a disposed on a bottom side of the upper glass plate 101 and a pin 126b disposed on a top surface of the lower glass plate 102 that is configured to mate with the socket 126a. The pin-and-socket structure 126 serves to enable that the lower glass plate 102 is coarsely aligned with the upper glass plate 101 before solder reflow, or in place of solder balls 119b, during manufacture so that the optical path from the opto-electronic device 116b to the lower glass plate 102 is properly aligned. In other embodiments, different types of mechanical alignment features can be used to align the glass plates 101, 102. As a non-limiting example, the pin-and-socket structure 126 could be reversed with the socket 126a disposed on the top surface of the lower glass plate 102 and the pin 126b can extend from the bottom surface of the upper glass plate 101. Another non-limiting example includes alignment features of various precision, such as large posts and holes for coarse alignment and finer posts and holes for follow-on fine alignment. The coarse alignment posts may be implemented using metal pins inserted in a glass plate. The primary fine-alignment "post" can be a rectangular or triangular shape with the corresponding fine-alignment hole being a complimentary shape but larger size than the fine-alignment post so that datum defined on two sides forming an angle, will allow upper glass plate to wedge and rest against the two intersecting data for precision-aligned rest position.

As discussed above, the upper glass plate 101 can include one or more pass-through optical vias 127 to enable the one or more opto-electronic devices 116b to optically couple with the one or more waveguides 104 disposed in the lower glass plate 102. The one or more pass-through optical vias 127 are aligned with the one or more optical vias 129 of the lower glass plate. The pass-through optical via 127 is a through-hole, wherein the optical signal can pass through the upper glass plate 101 to and from the lower glass plate to the opto-electronic devices 116b without impedance. As a non-limiting example, a VCSEL 116b can optically couple to a waveguide of the one or more waveguides 104 in the lower glass plate 102 through an optical opening 128 of the electronic substrate 118, into and through the pass-through optical via 127 of the upper glass plate 101, and into a lower-plate optical via 129 of the lower glass plate 102. A directional mirror 130 disposed in each of the associated lower-plate optical via 129 of the lower glass plate 102 optically couples the output from the VCSEL 116b into one or more waveguides of the one or more waveguides 104 terminating at the lower-plate optical via 129. In various embodiments, the directional mirror 130 can be disposed in the lower-plate optical via 129 of the lower glass plate 102 through a void 131 in a similar manner as that discussed with the respect to directional mirror 124. The pass-through optical via 127 in FIG. 1 is positioned behind the upper-plate optical via 123 of the upper glass plate 101 (i.e., further along the x-direction away from the faceplate 107). In other embodiments, the pass-through optical via 127 may be positioned in front of the upper-plate optical via 123 (i.e., closer to the faceplate 107 along the x-direction), where the waveguides 103 of the upper glass plate 101 are routed around the pass-through optical vias 127. In such embodiments, the lower-plate optical vias 129 of the lower glass plate 102 can be positioned closer to the faceplate 107 (i.e., at a position in the x-direction along the lower glass plate 102 closer to the faceplate 107).

The GaaP assembly 100A can be disposed on a system board 140 within a computing device. In various embodiments, a bottom surface of the lower glass plate 102 can be configured to couple to the system board 140 using any conventional means of attaching glass to such substrates known in the art. In some embodiments, the GaaP assembly 100A may include one or more traces from the system board 140 to the electronic substrate 118, including but not limited to control and power signals.

Although only two opto-electronic devices 116a, 116b are depicted in FIG. 1, in various embodiments the GaaP assembly 100A can include a plurality of opto-electronic devices in the z-direction (i.e., into the page). Although only two opto-electronic devices 116a, 116b are shown on the electronic substrate along the x-direction (i.e., left to right), in other embodiments a plurality of other opto-electronic devices may be disposed along the electronic substrate 118 along the z-direction. In various embodiments, one or more electronic substrates can be coupled to the same upper glass plate 101 along the z-direction, with each electronic substrate having its own set of one or more waveguides disposed within the upper glass plate 101, the lower glass plate 102, or a combination of both and being associated with the respective electronic substrate.

Figure 2:
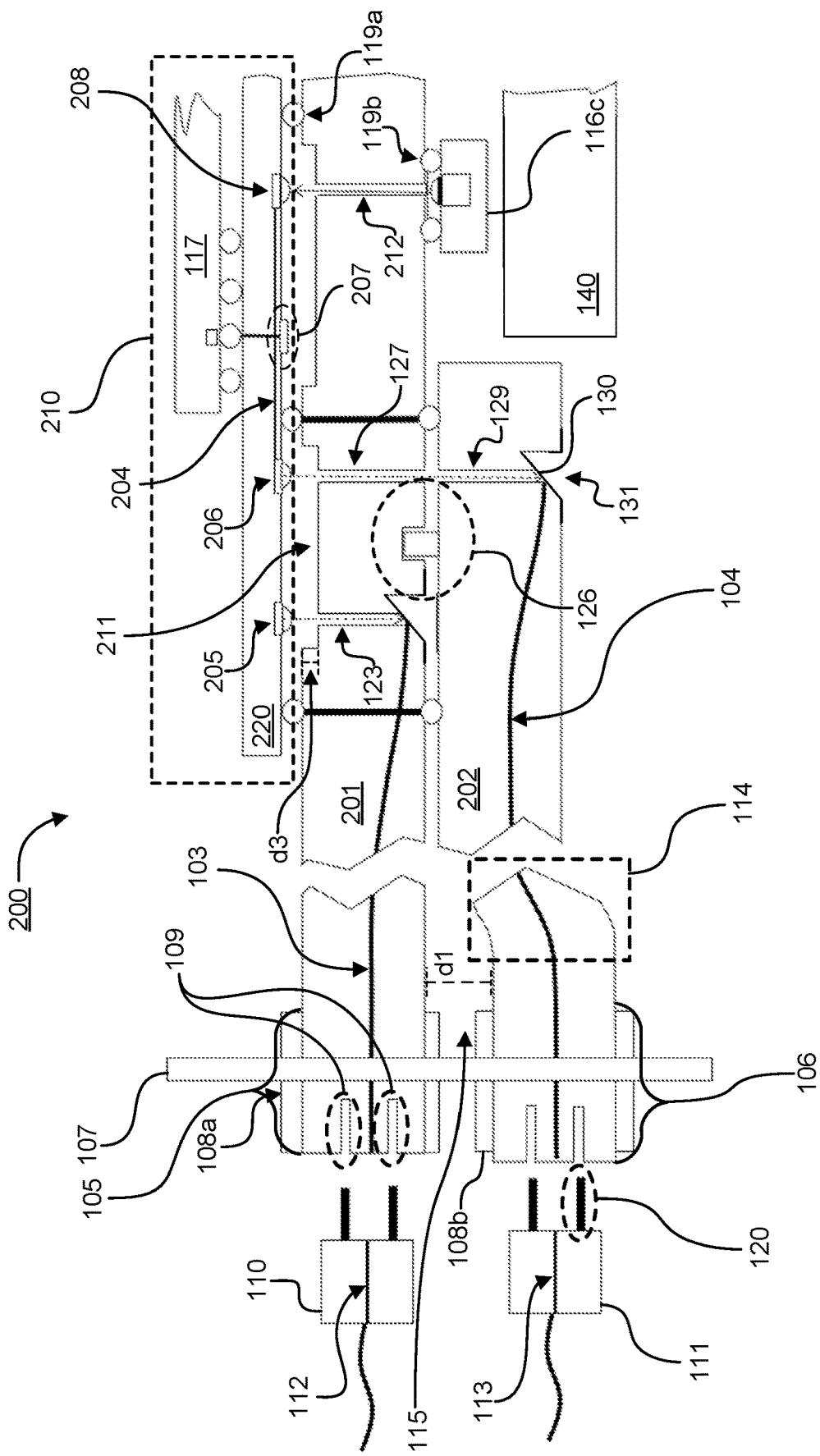
FIG. 2 is a cross-sectional view of another example GaaP assembly in accordance with embodiments of the technology disclosed herein.

As discussed above, FIG. 1A depicts an example GaaP assembly 100A wherein the opto-electronic devices are co-packaged with the switch ASIC 117 comprise VCSELs. FIG. 2 illustrates another example GaaP assembly 200 comprising an example silicon photonics (SiPHs) assembly 210 in accordance with embodiments of the technology disclosed herein. Where elements within FIG. 2 utilize references common between one or more other figures, the discussion accompanying the use of those references should be considered applicable to FIG. 2 unless otherwise stated. The GaaP assembly 200 includes an upper glass plate 201 and a lower glass plate 202, each of which are similar to the glass plates 101, 102 discussed with respect to FIG. 1. The GaaP assembly 200 further includes the elements of the GaaP assembly 100A of FIG. 1A, and the discussion of such elements is applicable to the GaaP assembly 200 of FIG. 2.

The SiPHs assembly 210 comprises a switch ASIC 117 disposed on a SiPH die 220 comprising a plurality of optical components for a photonic system utilizing silicon as the optical medium. As illustrated in FIG. 2, the SiPHs die 220 includes a plurality of coupler components 205, 206, 208 configured to couple light into or out of one or more waveguides 204. In various embodiments, one or more modulators 207 electrically communicatively coupled to the switch ASIC 117 and configured to control the modulation of light within the one or more waveguides 204. In various embodiments, the one or more coupler components 205, 206, 208 can comprise one or more types of grating couplers, one or more types of edge couplers, or a combination thereof. In various embodiments, each of the one or more coupler components 205, 206, 208 can include a lens component having focal point configured for the distance, light is to travel between the coupler component and other optical components (e.g., a directional mirror, a light source, etc.). The coupler components 205, 206, 208 can be configured to couple the light from the opto-electronic device 116c into (through coupler component 208) and out of (through coupler components 205, 206) the SiPH die 220, either directionally (e.g., changing the direction of the emitted light) or evanescently (e.g., keeping the direction of the emitted light along a parallel path).

In various embodiments, one or more optical components of the SiPH die 220 may extend below the surface of the SiPH die 220, requiring the top surface of the upper glass plate 201 to have one or more cut outs 211 configured to enable one or more optical components of the SiPH die 220 to extend below a top surface of the upper glass plate 201 to a tolerance depth d3. In various embodiments, the tolerance depth d3 may vary between one or more cut outs 211. In various embodiments, each of the one or more cut outs 211 may extend between each of solder balls 119a.

In the example GaaP assembly 200, the one or more optical sources and/or sinks can be disposed on the bottom side of the upper glass plate 201. Although the GaaP assembly 200 illustrates the one or more opto-electronic devices 116c disposed on the bottom side of the upper glass plate 201, in other embodiments one or more opto-electronic devices 116c can be disposed on the top surface of the upper glass plate, the bottom surface of the lower glass plate, the top surface of the lower glass plate, the bottom surface of the SiPH die 220, a top surface of the SiPh die 220, or a combination thereof. As illustrated in FIG. 2, an opto-electronic source 116c is depicted, but the technology disclosed herein is not limited solely to optical sources, with an optical sink being disposed on the bottom side of the upper glass plate 201 in various embodiments. For ease of discussion, the GaaP assembly 200 shall be discussed with respect to an opto-electronic source 116c. In various embodiments, the opto-electronic source 116c can comprise a laser, including but not limited to Fabry-Perot lasers, Distributed Feedback (DFB) lasers, comb lasers, hybrid lasers, among others. The GaaP technology of the present disclosure is not limited in scope to any specific type of opto-electronic device 116c.

The opto-electronic source 116c is configured to emit a light signal to an associated coupler component 208 of the SiPH die 220 through one or more functional vias 212 disposed in the upper glass plate 201 that rest above the output of the opto-electronic source 116c. In the embodiment depicted in FIG. 2, a functional via 212 is disposed in the upper glass plate 201 as only the upper glass plate 201 is positioned above the opto-electronic source 116c. In the depicted embodiment, the lower glass plate 202 does not extend to the opto-electronic device 116c, having a smaller length from the faceplate 107 than the upper glass plate 201, rather than over the top surface of the system board 140 and the opto-electronic source 116c as the upper glass plate 201 is depicted. In other embodiments, the lower glass plate 202 can rest over the top surface of the system board 140 and the opto-electronic source 116c, the opto-electronic device 116c being disposed on the bottom side of the lower glass plate 202, and including a second functional via 212 in the lower glass plate 202 to enable the opto-electronic source 116c to emit the light signal through a first functional via in the upper glass plate and the second functional via in the lower glass plate. The light emitted from the opto-electronic source 116c is coupled into the one or more waveguides 204 by the coupler component 208. In various embodiments, one or more of the functional vias 212 can be replaced with a vertical waveguide having lenses disposed on each end of the vertical waveguide, similar to the vertical waveguide 132 discussed with respect to FIG. 1C. The light is routed through the one or more waveguides 204 to the coupler elements 205, 206 configured to couple the light signal out of the one or more waveguides 204 and through the optical vias of the glass plates.

The example GaaP assembly 100A, GaaP assembly 100B and GaaP assembly 200 each comprise a stack, with the electronic substrate 118 or SiPH assembly 210 disposed on top of the upper glass plate 101, which is disposed on top of the lower glass plate 102. In various embodiments, additional glass plates may be disposed beneath the lower glass plate 102. For each additional glass plate, the electronic substrate 118 or SiPH assembly 210 can include an additional one or more opto-electronic devices associated with the waveguides of the one or more waveguides of the additional glass plate, and an optical via can be disposed in each of the upper glass plate 101 and the lower glass plate 102 for each of the one or more additional opto-electronic device to enable optical coupling between an opto-electronic device and one or more waveguides of the additional glass plates.

In other embodiments, the upper glass plate and lower glass plate may be stacked (i.e., over-under parallel) near the faceplate 107, but side-by-side parallel beneath the electronic substrate 118 or the SiPH assembly 220. FIGS. 3A-3B and FIGS. 4A-4B illustrate example GaaP assembly 300 and GaaP assembly 400, respectively, in accordance with embodiments of the technology disclosed herein. Where elements within FIGS. 3A-4B utilize references common between one or more other figures, the discussion accompanying the use of those references should be considered applicable to FIGS. 3A-4B unless otherwise stated. The example GaaP assembly 300 of FIGS. 3A and 3B and the example GaaP assembly 400 of FIGS. 4A and 4B includes an upper glass plate 301, 401 and a lower glass plate 302, 402, respectively, each of which is similar to the glass plates 101, 102, 201, 202 discussed with respect to FIGS. 1 and 2. The GaaP assembly 300 and the GaaP assembly 400 further includes the elements of the GaaP assembly 100A, GaaP assembly 100B or the GaaP assembly 200 (depending on the type of co-packaged optical system with the switch ASIC or other electronic components), and the discussion of such elements is applicable to the GaaP assembly 300 and the GaaP assembly 400 of FIGS. 3A-3B and 4A-4B, respectively.

Figure 3A:
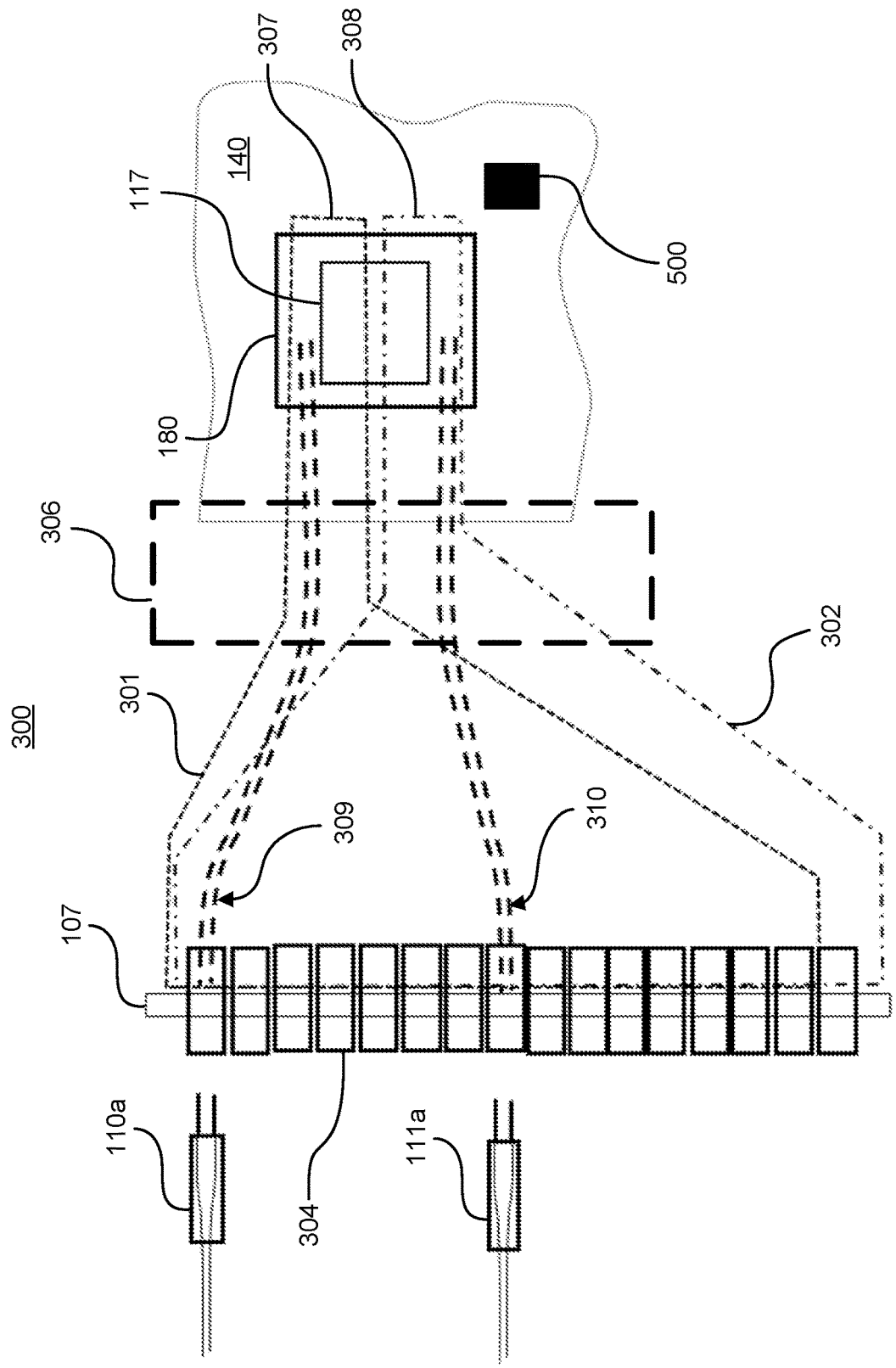
FIG. 3A is a top view of an example GaaP assembly in accordance with embodiments of the technology disclosed herein.
Figure 3B:
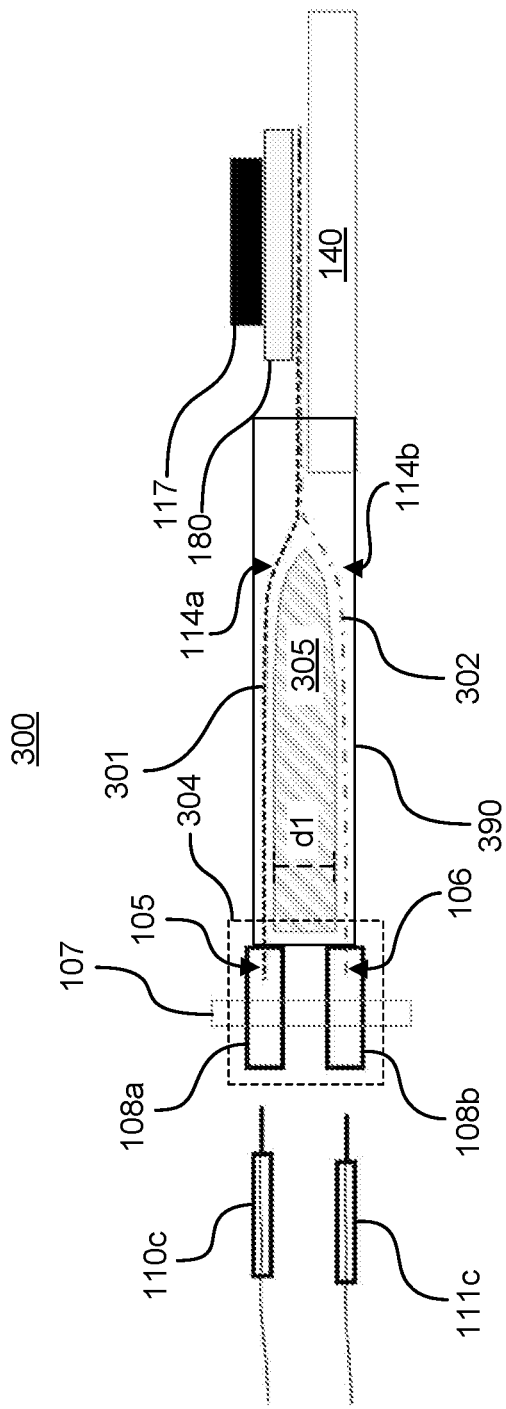
FIG. 3B is a cross-sectional view of the example GaaP assembly of FIG. 3A in accordance with embodiments of the technology disclosed herein.
Figure 4A:
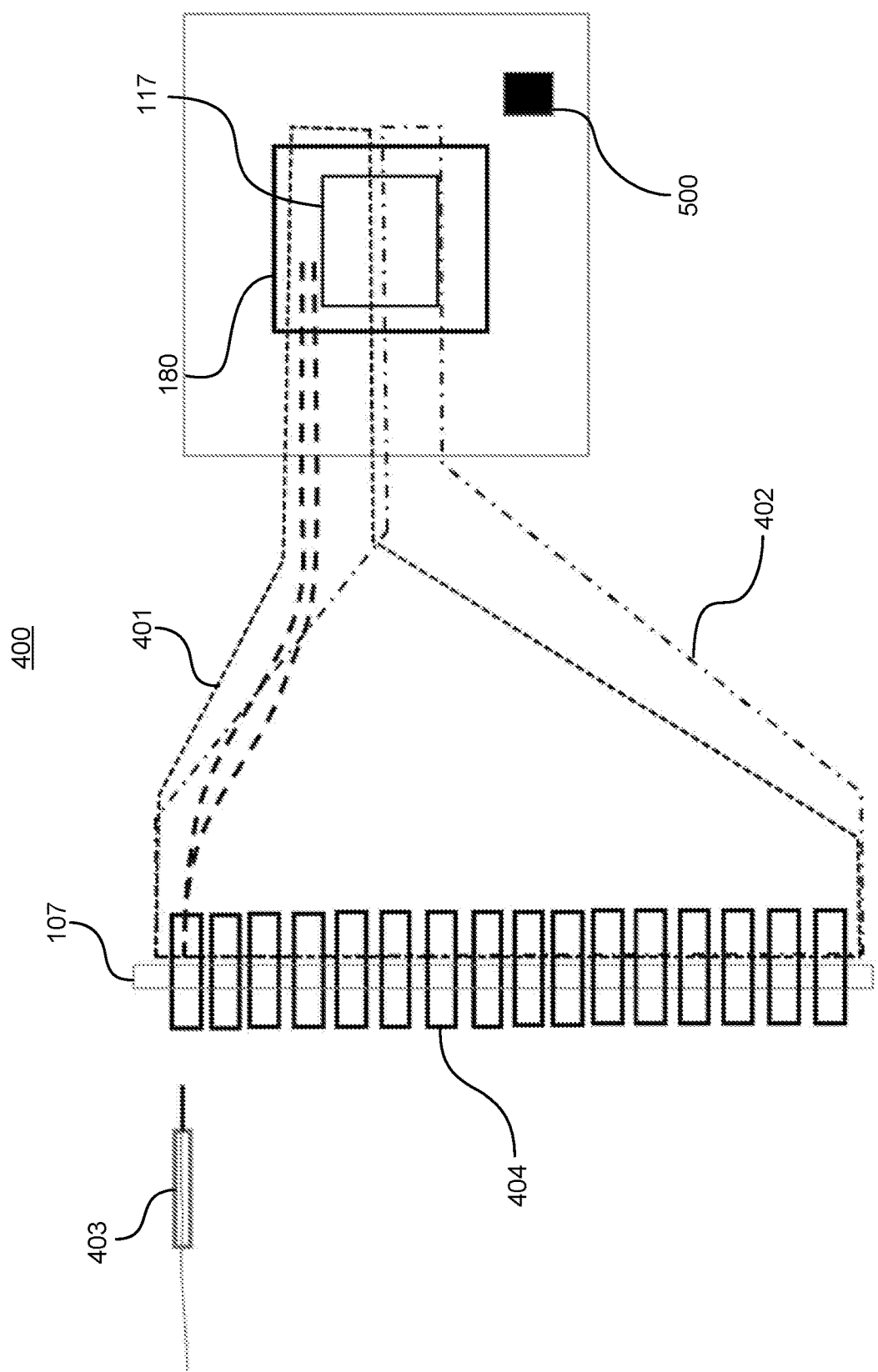
FIG. 4A is a top view of an example GaaP assembly in accordance with embodiments of the technology disclosed herein.
Figure 4B:
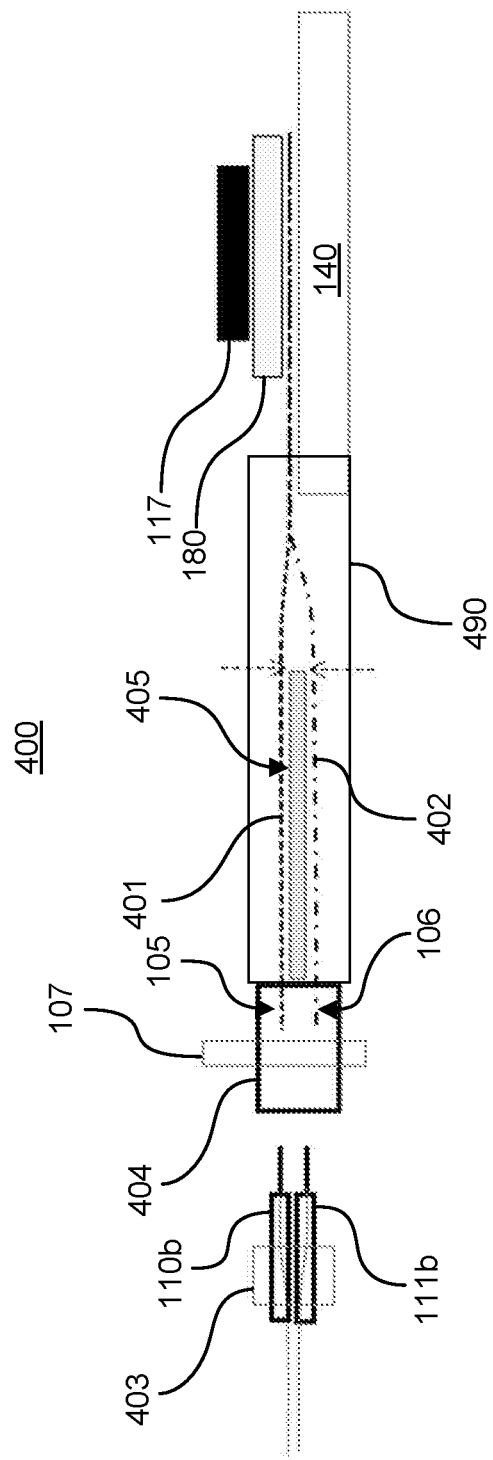
FIG. 4B is a cross-sectional view of the example GaaP assembly of FIG. 4A in accordance with embodiments of the technology disclosed herein.
Figure 5:
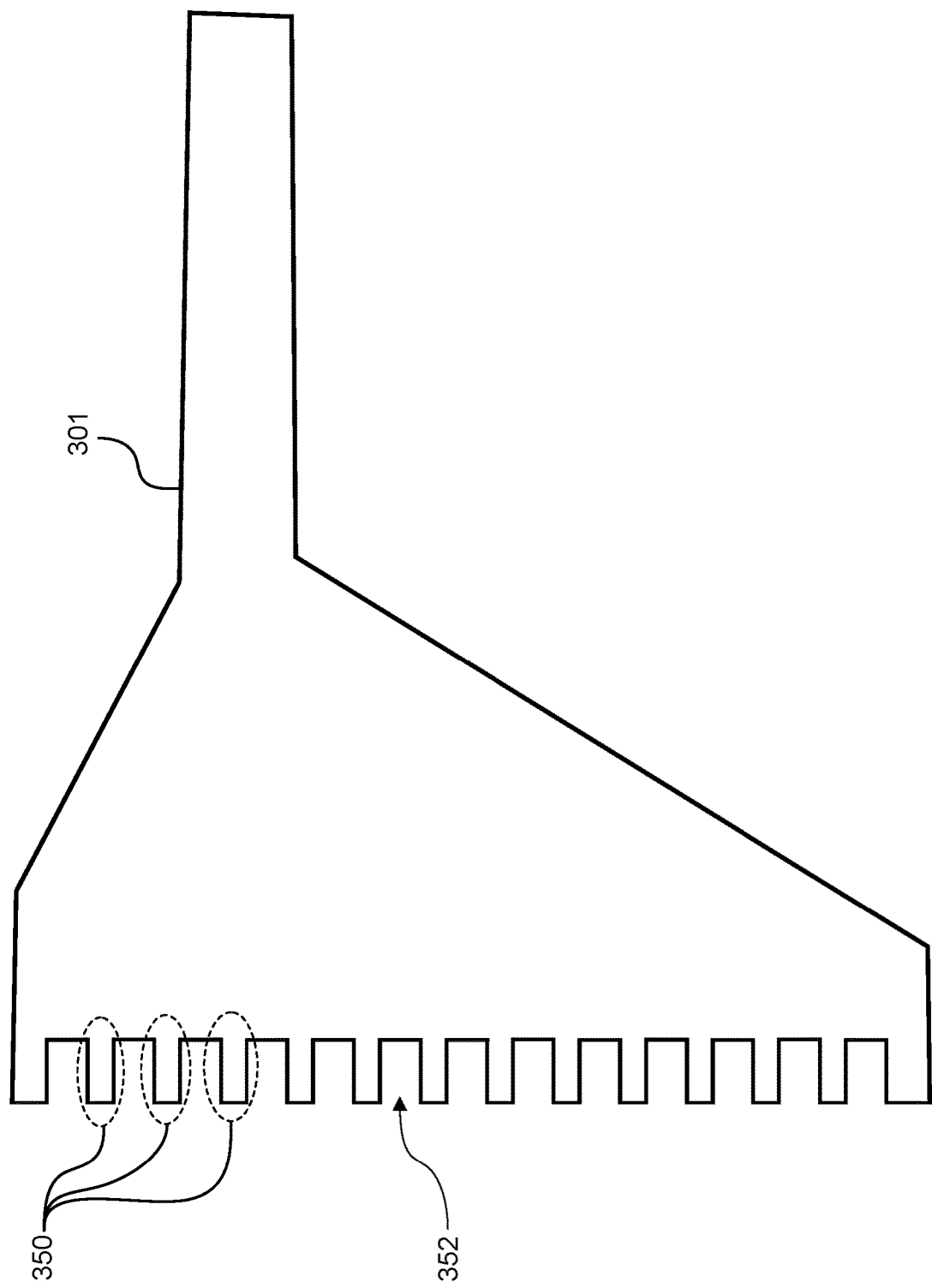
FIG. 5 is an example upper glass plate of an example GaaP assembly in accordance with embodiments of the technology disclosed herein.

Referring to FIG. 3A, a top view of the GaaP assembly 300 is depicted. The GaaP assembly 300 includes an upper glass plate 301 and a lower glass plate 302 (each including one or more waveguides 309, 310, respectively), a switch ASIC 117, a photonic die 180, and a system board 140. In various embodiments, one or more electronic components 500 (e.g., a system management controller IC, etc.) can be disposed on the system board 140 and communicatively coupled to the switch ASIC 117 (or other electronic die comprising integrated circuits) and/or the photonic die 180. The switch ASIC 117 and the photonic dies 180 are disposed above the upper glass plate 301 and the lower glass plate 302, and the system board 140 is disposed beneath the upper glass plate 301 and the lower glass plate 302, as shown in FIG. 3B. The upper glass plate 301 and the lower glass plate 302 each comprise a plurality of connector ends disposed on the faceplate interfaces 105, 106, each connector end associated with a connector housing of each stacked connectors 304 disclosed in FIG. 3A. An example upper glass plate 301 is illustrated in FIG. 5, depicted the plurality of connector ends 350. Although referring to the upper glass plate 301, the shape, configuration, and elements of the upper glass plate 301 discussed with respect to FIG. 5 can be applied equally to any of the other glass plates discussed with respect to FIGS. 1-8. Referring to FIG. 5, the connector ends 350 may be similar to the connector ends 155, 156 discussed above with respect to FIGS. 1A and 1B. In various embodiments, the plurality of connector ends 350 extend along a horizontal width of the upper glass plate 301. As shown, each connector end 350 may be separated by a horizontal gap 352 such that each connector end 350 can be inserted within an associated connector housing 108. In other embodiments, connector ends 350 may not be separated by horizontal gap 352 where other mechanical features, such as holes, may be present for a connector housing 108 to be associated with each connector end 350. Although discussed with reference to the example upper glass plate 301 in FIG. 5, the lower glass plate 302 and other additional glass plates can have a similar shape and configuration.

Referring back to FIG. 3A, a connector end of each of the upper glass plate 301 and the lower glass plate 302 are configured to be inserted into an associated connector housing 108a, 108b within the stacked faceplate connector 304, as shown in FIG. 3B. As illustrated in FIG. 3B, each faceplate interface end 105, 106 of the upper glass plate 301 and the lower glass plate 302, respectively, is an independent connector configured to mate with a simplex optical cable ferrule 110c, 111c (as shown in FIG. 3B) or a duplex optical cable ferrule 110a, 111a (as shown in FIG. 3A), respectively. Each faceplate interface end 105a, 106a is configured to carry both transmit and receive signals for each simplex optical cable ferrule 110c, 111c or duplex optical cable ferrule 110a, 111a connected to each respective connector end 155, 156. In various embodiments, the upper glass plate 301 and/or the lower glass plate 302 can include a bend 114a, 114b, respectively, while in other embodiments both the upper glass plate 301 and the lower glass plate 302 can include a bend 114a, 114b, respectively, such that there is a separator gap (like separator gap 115 discussed with respect to FIG. 1) having a distance dl, providing clearance for the size of the cable connectors 110a, 111a, 110c, 111c. In the various embodiments, a structural spacer 305 can be disposed within the separator gap 115, as depicted in FIG. 3B. In various embodiments, the structural spacer 305 can be made of a variety of materials, including plastic, glass, metal, among others. In some embodiments, the GaaP assembly 300 can comprise a support structure 390 configured to secure the GaaP assembly 300 to a system chassis (not shown in FIG. 3B), the faceplate 107, and/or the system board 140. The support structure 390 can comprise one or more brackets, one end configured to be secured to the GaaP assembly 390 and the other end configured to be secured to the chassis, faceplate 107, and/or system board 140. The bracket (not shown in FIG. 3B) can be secured using one or more of retainment components, including but not limited to screws, welded joints, bolts, epoxy, rivets, features configured to connect to one or more sockets, or a combination thereof. In some embodiments, the support structure 390 may comprise a housing configured to surround the GaaP assembly 300. In some embodiments, the housing may comprise one side, wherein the GaaP assembly 300 is configured to be secured to an interior face of the side by one or more brackets or other securing means, and one or more additional securing features are disposed on an exterior face of the side for securing the housing to the chassis, the faceplate 107, and/or the system board 140. In various embodiments, the one or more support structures 390 can comprise one or more shock absorbing material (not shown in FIG. 3B) configured to absorb motion of the GaaP assembly 300. In various embodiments, the shock absorbing material can be one or more of foam board, foam pad, injection molded foam, rubber pad, corrugated plastic, spring-shaped plastic, leaf springs, plastic, metal sheets with arrays of coil springs, or a combination thereof. A similar support structure 490 is shown in FIG. 4B, and the above discussion applies equally in that case. Although not shown in the GaaP assemblies depicted in FIG. 1A, 1C, 2, 3A, 4A, 5, 6A, 7, 8A, or 8B, the support structure 390 can be included in various embodiments of all GaaP assemblies discussed in the present disclosure herein.

As shown in FIG. 3A, the upper glass plate 301 and the lower glass plate 302 are over-under parallel closer to the faceplate 107, and then become side-by-side parallel at a merge region 306. The merge region 306 is the area within which either or both of the glass plates 301, 302 comprise the bend 114a, 114b, respectively, such that both glass plates 301, 302 are positioned side-by-side parallel to each other on the same plane. Each of the glass plates 301, 302 comprise a shape wherein the connector-end nearest the faceplate 107 has a width larger than a distal end 307, 308 of the upper glass plate 301 and the lower glass plate 302, respectively. Following the merge region 306, the upper glass plate 301 and the lower glass plate 302 each rest adjacent to each other (as shown in FIG. 3A) and underneath the photonics die 180 (as illustrated in FIG. 3B). Because the GaaP assembly 300 does not stack the glass plates, unlike the GaaP assembly 100A, GaaP assembly 100B and GaaP assembly 200, the upper glass plate 301 does not require a second optical via to enable one or more waveguides disposed in the lower glass plate 302 to optically couple to the photonics die 180.

As discussed above, the GaaP assembly 300 illustrates an example embodiment where the upper glass plate 301 and the lower upper glass plate 302 are each configured to transmit both transmit and receive signals so that each pair of a transmit and a receive signals are routed to couple with a corresponding cable connector 110a, 111a, 110c, 111c. In various embodiments each of the cable connectors 110, 111 may include more than one fiber, such as the non-limiting examples of 8 fibers, 12 fibers, or 16 fibers, among others. The GaaP assembly 400 of FIGS. 4A and 4B illustrates an example embodiment where each glass plate is configured to carry either the transmit signals or the receive signals. Referring to FIG. 4A, the GaaP assembly 400 includes an upper glass plate 401 and a lower glass plate 402, which are similar to the glass plates 301, 302 discussed with respect to FIGS. 3A and 3B. As illustrated, one connector end of each glass plate 401, 402 are inserted into a duplex connector housing 404. In various embodiments, the duplex connector housing 404 may comprise a monolithic housing component, while in other embodiments the duplex connector housing 404 can comprise separate connectors, such as the first connector housing 108a connected with the second connector housing 108b discussed with respect to FIGS. 1-2. Each duplex connector housing 404 is configured to mate with a duplex cable connector 403. As illustrated in FIG. 4B, the duplex cable connector 403 comprising a transmit ferrule 110b (configured to carry transmit signals) and a receive ferrule 111b (configured to carry receive signals). In various embodiments, the transmit ferrule 110b can be configured to connect with a faceplate interface end 105 of the upper glass plate 401 in the duplex connector housing 404, and the receive ferrule 111b can be configured to connect with a faceplate interface end 106 of the lower glass plate 402 in the duplex connector housing 404. In this way, the upper glass plate 401 is configured to carry only transmit signals and the lower glass plate 402 is configured to carry only receive signals. In various embodiments, the polarity of the glass plates (i.e., transmit-only, receive-only) can be switched. In various embodiments, each of the glass plates 401, 402 may be separated by a smaller structural spacer 405, while in other embodiments an air gap can form the separation gap. In some embodiments, transmit ferrule 110b and receive ferrule 111b may be floated with a tolerance of the spacer 405 to allow proper mating to glass plates 105 and 106, respectively, within a duplex connector housing 404.

Although the embodiments in FIGS. 3A and 4A illustrate two glass plates, where an upper glass plate 301, 401 is above a lower glass plate 302, 402 closer to the faceplate 107 and the upper glass plate 301, 401 and lower glass plate 302, 402 are parallel under the co-packaged substrate (180 and 117), in other embodiments different arrangements are applicable. As a non-limiting example, in other embodiments at least two glass plates can be configured to be parallel to each other both at the faceplate 107 and under the co-packaged substrate. In still another non-limiting example, a single glass plate may be used where the glass plate is shaped similar to the shape discussed with respect to FIGS. 3A, 4A, and 5, with the single glass plate being straight or having a bend similar to the bends 114 discussed with respect to FIGS. 1-4B. Moreover, the GaaP technology is applicable with any optical cable connector type used for an implementation, with the connector ends of the glass plates being shaped such that the connector ends are compatible with the implemented connector type. In various embodiments, the one or more waveguides in one or more glass plates may be more densely positioned within the glass plate to interface to fewer optical connectors required, minimizing the overall size of the glass plate. The technology disclosed herein is compatible with different categories of optical connectors, including but not limited to faceplate-type connectors, blind-mate-type connectors, optical midplane-type connectors, etc.

The GaaP assembly embodiments discussed so far have consisted of multiple glass plates serving as the platform for both optical and electrical signals. In some embodiments, the GaaP assembly can comprise a single glass plate 601, as illustrated in the example GaaP assembly 600 depicted in FIGS. 6A and 6B. The GaaP assembly 600 comprises a single glass slab 601 having a centerline CL defining an upper glass portion 601a and a lower glass portion 601b. In various embodiments, the glass slab 601 can comprise more than two portions, having two or more centerlines CL. In various embodiments, each glass portion 601a, 601b can comprise a plurality of waveguides 602, 603, respectively, similar to the waveguide discussed above with respect to FIGS. 1-5. The one or more waveguides 602 disposed in the upper glass portion 601a can be routed around the one or more first optical vias 604. The one or more first optical vias 604 extend through the upper glass portion 601a into the lower glass portion 601b, enabling the directional mirror 124 to optically couple light into and/or out of the optoelectronic device 116a and the one or more waveguides 603 of the lower glass portion 601b. In various embodiments, the plurality of the optical vias disposed in the glass slab 601 are configured such that the optical via closest to the faceplate (e.g., the first optical via 604 of FIG. 6A) is configured to optically couple to the one or more waveguides of the lowest glass portion of the glass slab 601, with the second optical via enabling optical coupling with the second to the lowest glass portion, and so on. As the voids (e.g., the voids 125, 131) used to dispose the directional mirrors (e.g., the directional mirrors 124, 130) have a larger diameter than the optical vias.

Figure 6A:
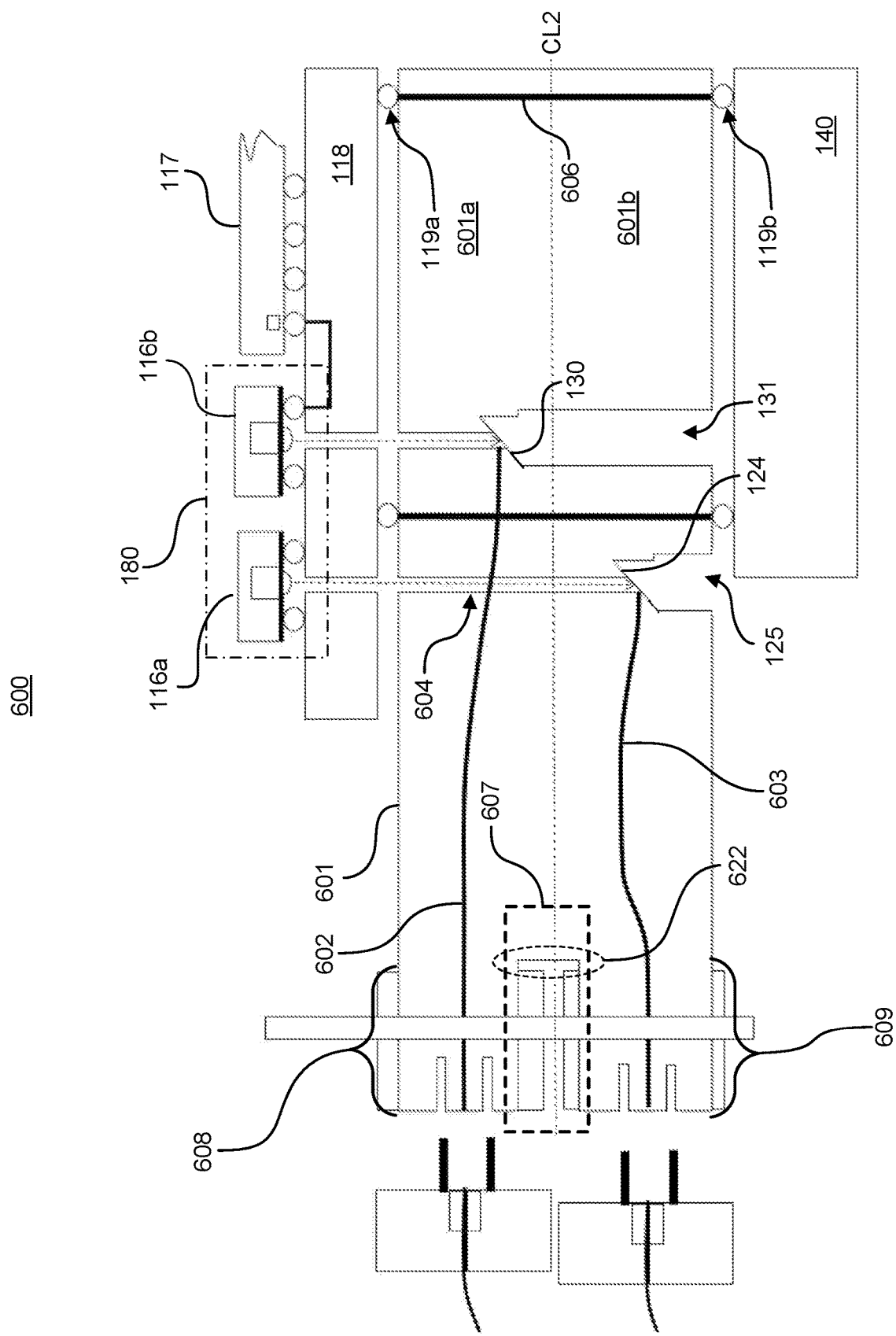
FIG. 6A is a cross-sectional view of another example GaaP assembly in accordance with embodiments of the technology disclosed herein.

The solder balls 119a can assist in aligning all of the optical vias of the glass slab 601 with the opto-electronic devices of the photonics die 180. In various embodiments, the connector via 606 between solder balls 119a and solder balls 119b can couple power and/or management signals from the system board 140 to the electronic substrate 118. The glass slab 601 can include a notch 607 to separate the one or more connector ends 608 of the upper glass portion 601a and the one or more connector ends 609 of the lower glass portion 601b. FIG. 6B illustrates a front view of the GaaP assembly 600 of FIG. 6A. The front view shows the end of the glass slab 601 comprising the connector ends 608, 609. Each connector end 602, 603 comprises a termination end 630 for one or more or the waveguides 602, 603 and one or more connector structures 109. As illustrated, the notch 607 can extend along the horizontal width W of the glass slab 601. A plurality of breaks 615 may be displaced between each of the stacked connector ends 602, 603, resulting in each connector end 602, 603 extending off a backstop 622 (as shown in FIG. 6A and represented by the grid pattern in FIG. 6B) such that no connector end 602, 603 is in contact with any other connector end 602, 603.

Figure 7:
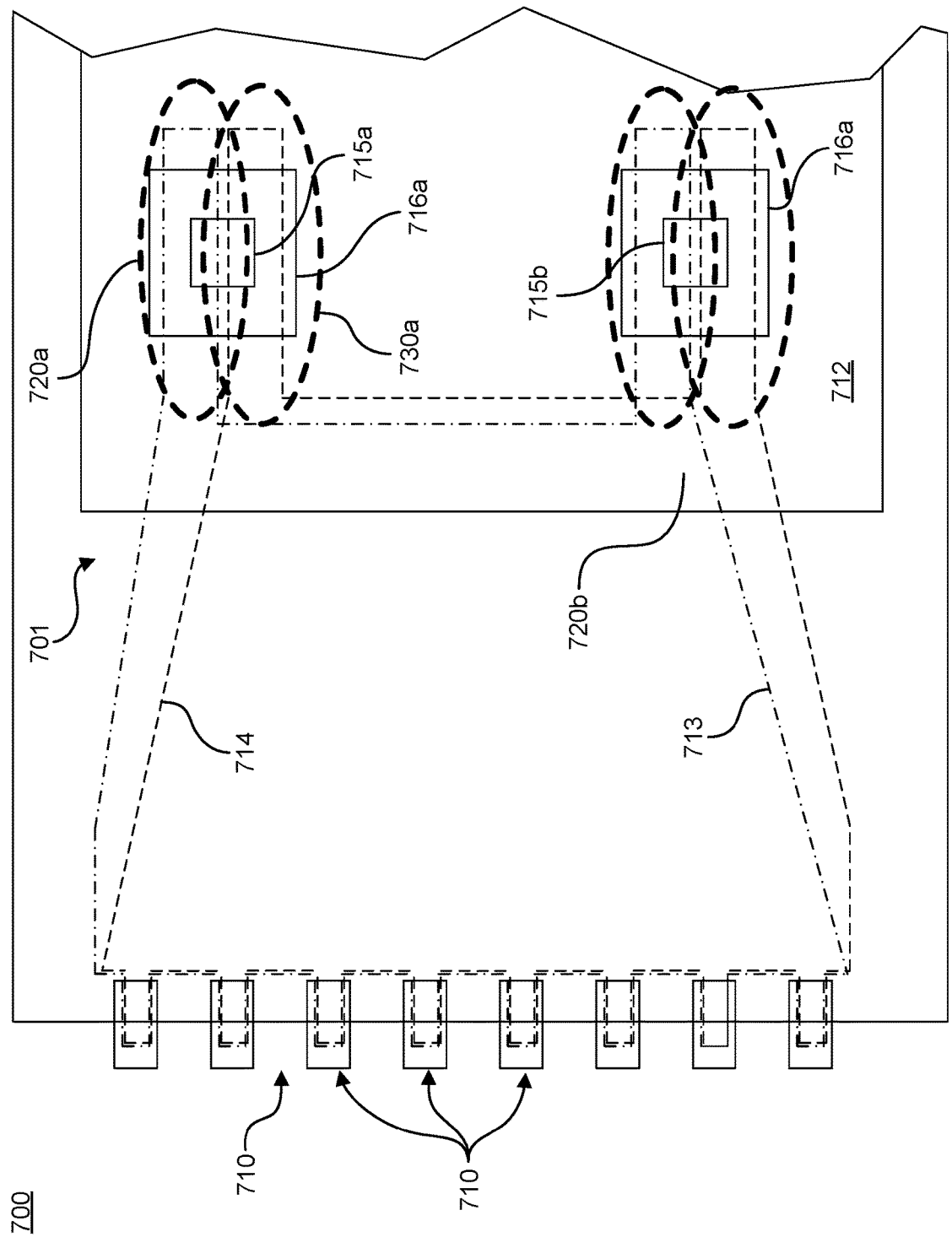
FIG. 7 is a top view of another example GaaP assembly in accordance with embodiments of the technology disclosed herein.

The embodiments discussed above disclose each glass plate comprises a first end having one or more connector ends extending through the faceplate of a device enclosure and a second end of the glass plates positioned beneath an electronic substrate and/or SiPH assembly. In some embodiments, one or more of the glass plates may include one or more component ends, wherein the optical/photonics die and the electronic die are disposed. FIG. 7 illustrates an example system 700 comprising an example GaaP assembly 701 in accordance with embodiments of the technology disclosed herein. Although the system 700 is discussed with respect to the example GaaP assembly 701, one or more of the other example GaaP assemblies 100A, 100B, 200, 300, 400, and 600 are also applicable to the system 700. For ease of discussion, only the optical interface portion of the system 700 is shown, wherein one or more GaaP assemblies can be disposed. The example GaaP assembly 700, as well as the other example GaaP assemblies disclosed in the present disclosure, are not drawn to scale and the technology should not be limited to the number or placement of the components discussed herein.

As shown in FIG. 7, the system 700 includes an example GaaP assembly 701, which is similar to the GaaP assemblies 100A, 100B, 200, 300, 400, and 600 discussed with respect to FIGS. 1-6B. The system 700 includes an enclosure having a faceplate 710 comprising a plurality of connector housings 711 disposed therein, each connector housing 711 having an external side outside of the enclosure in front of the faceplate 710 and an internal side inside the enclosure behind the faceplate 710. The enclosure further comprises a system board 712, to which the GaaP assembly 701 is connected to provide the system board 712 with an electrical to optical interface. As illustrated in FIG. 7, the GaaP assembly 700 can comprise and upper glass plate 713 and a lower glass plate 714, similar to the glass plates discussed with respect to FIGS. 1-6B above. For ease of discussion, the GaaP assembly 701 is similar to the GaaP assembly 300 and GaaP assembly 400 with respect to the upper glass plate and the lower glass plate being disposed parallel and adjacent to each other underneath a photonics die and the electronics die.

The GaaP assembly 701 is configured to provide optical connections to two co-packaged boards, a first co-packaged board comprising a first electronics die 715a disposed on a first photonics die 716a, and a second co-packaged board comprising a second electronics die 715b disposed on a second photonics die 716b. In various embodiments, the first electronics die 715a and the first photonics die 716a are disposed over a first system interface peninsula 720a of the upper glass plate 713 and a first system interface peninsula 730a of the lower glass plate, and the second electronics die 715b and the second photonics die 716b are disposed over a second system interface peninsula 720b of the upper glass plate 713 and a second system interface peninsula 730b of the lower glass plate 714. A first subset of one or more waveguides (not shown in FIG. 7) disposed within the upper glass plate 713 can be routed to the first system interface peninsula 720a to optically couple with one or more optical components of the first photonics die 715a, and a second subset of the one or more waveguides disposed within the upper glass plate 713 can be routed to the second system interface peninsula 720b to optically couple with one or more optical components of the second photonics die 715b. The one or more waveguides (not shown in FIG. 7) disposed in the lower glass plate 714 can be similarly routed such that a first subset of the waveguides in the lower glass plate is routed to the first system interface peninsula 730a and a second subset in the lower glass plate is routed to the second system interface peninsula 730b. In this way, each glass plate 713, 714 includes one or more waveguide or one or more waveguides can optically couple to two different co-packaged photonics dies 715a, 715b, respectively.

In some embodiments, the glass plates may comprise a single system interface peninsula, such as the example embodiments discussed with respect to FIGS. 1-6B. For example, the portions of the upper glass plate 101 and the lower glass plate 102 of FIG. 1 disposed underneath the electronic substrate 118 comprise the system interface peninsula of each glass plate 101, 102.

Referring to FIG. 7, in various embodiments, a plurality of co-packaged boards (i.e., boards where a photonics die and an electronics die are packaged on the same substrate) can be disposed within the enclosure, with one or more co-packaged boards being disposed over each system interface peninsula of the glass plates 713, 714. In some embodiments, one or more of the GaaP assemblies 701 can be disposed within the enclosure, each GaaP assembly 701 configured to service a subset of the co-packaged boards within the enclosure. Although discussed with respect to embodiments where the glass plates are parallel and adjacent to each other under the co-packaged boards, the GaaP assembly 701 can also be implemented in a stack-style similar to FIGS. 1 and 2 in some embodiments, and in other embodiments the GaaP assembly 701 could comprise a single glass slab-style similar to that discussed with respect to FIG. 6.

By implementing embodiments of the technology disclosed herein, the number of optical and/or electronic interfaces required to route optical signals to and from the faceplate of a device enclosure in a computing network. A number of intermediate or interposer boards are eliminated because the electronics die and photonics die, comprising the optical components and ASIC(s) for the interface, are co-packaged onto the same substrate and disposed directly on one or more of the glass plates within a GaaP assembly implementation. The glass plates enable the optical signals from the co-packaged board to be directly coupled into one or more waveguides disposed within the glass plates, rather than having to design complex, bulky, costly, and custom chip ferrules to take the optical signals to and from the faceplate connections over multiple fiber strands of fiber jumpers. The GaaP assembly enables for higher density and higher bandwidth through the optical interface of the device because the GaaP assembly provides a smaller form factor capable of handling all of the optical routing and opto-electrical conversions compared to current chip ferrule-based solutions. By implementing optical waveguides within multiple glass plates of GaaP, number of optical signals can be scaled similar to how electrical signals can be efficiently scaled within multi-layer PCBs. Moreover, by encasing optical waveguides within multiple glass plates of GaaP under electronic die, heat extraction devices can be easily installed on the top side of high-power electronic die. All these can enable more compact, scalable and lower cost systems.

Figure 8A:
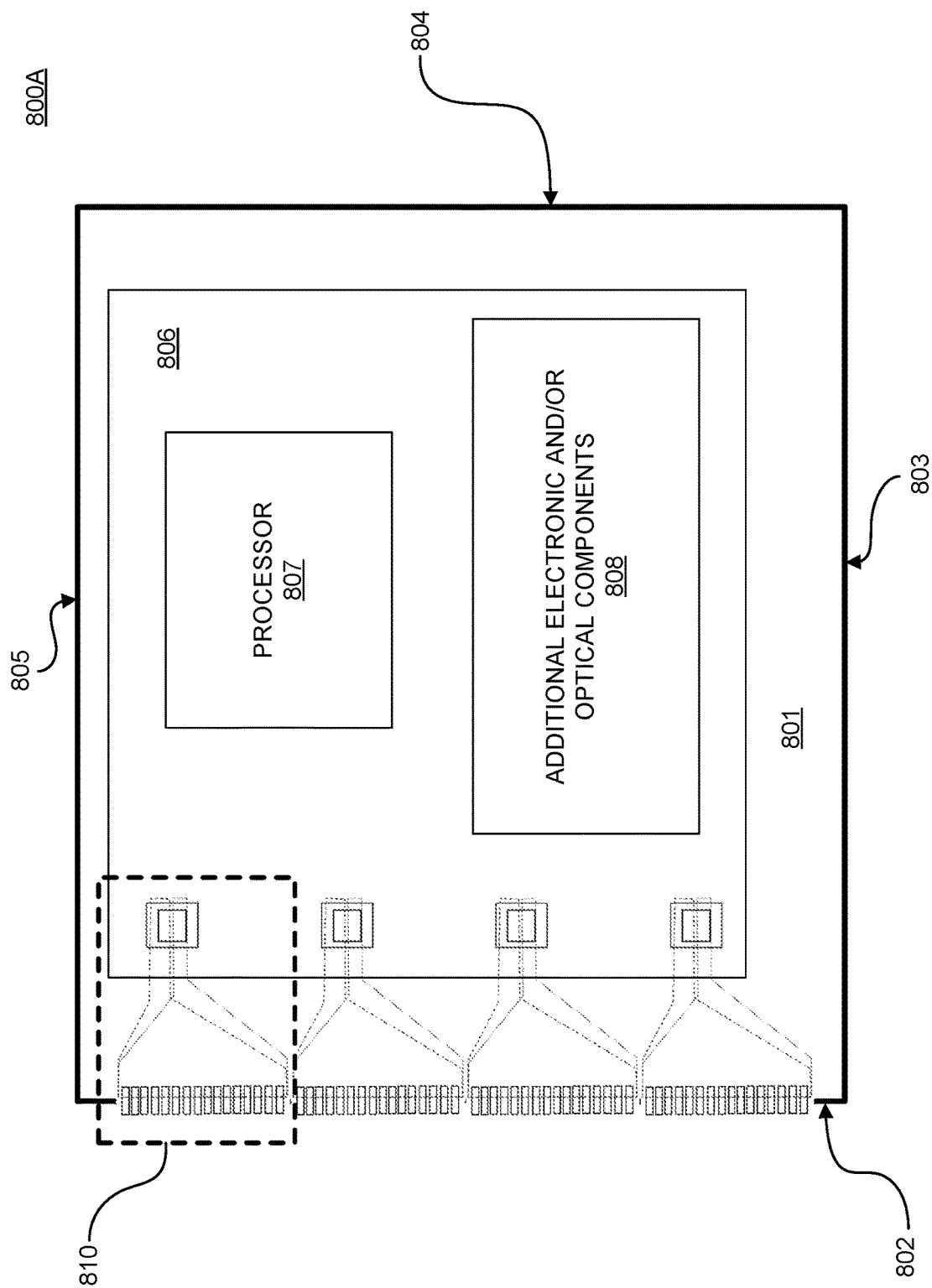
FIG. 8A is an example device in accordance with embodiments of the technology disclosed herein.

In various embodiments, a plurality of GaaP assemblies can be integrated into a computing device. FIG. 8A illustrates an example device 800A in accordance with embodiments of the technology disclosed herein. As illustrated, the device 800A includes an enclosure 801 having a faceplate 802 and three sides 803, 804, 805. The faceplate 802 is similar to the faceplate 107 discussed with respect to FIGS. 1-7. A system board 806 is disposed inside the enclosure 801. The system board 806 can include one or more processors 807. The one or more processors 807 can comprise one or more integrated circuits and/or software components configured to execute a set of non-transitory machine readable instructions to perform one or more functions. In various embodiments, additional electronic and/or optical components 808 may be disposed on the system board 806 and communicatively coupled to one or more of the processors 807. The one or more functions and the additional electronic and/or optical components 808 of the device 800 depends on the nature of the device, non-limiting examples including switches, blade servers, routers, high-performance computers, or other type of computing device. The GaaP technology disclosed herein is applicable for use in any system and/or device that implements one or more optical interfaces.

The device 800A further includes a plurality of GaaP assemblies 810. The GaaP assemblies 810 can be similar to the GaaP assemblies discussed above with respect to FIGS. 1-7. In some embodiments, one or more of the GaaP assemblies 810 can comprise a different type of GaaP assembly. As a non-limiting example, a first GaaP assembly 810 may be an embodiment in accordance with the GaaP assembly 100 discussed with respect to FIG. 1, and a second GaaP assembly 810 can be an embodiment in accordance with the GaaP assembly 700 discussed with respect to FIG. 7. The plurality of connector ends of the plurality of GaaP assemblies 810 extend out of the enclosure 801 through the faceplate 802, enabling one or more optical cables to be connected to the device 800A.

Figure 8B:
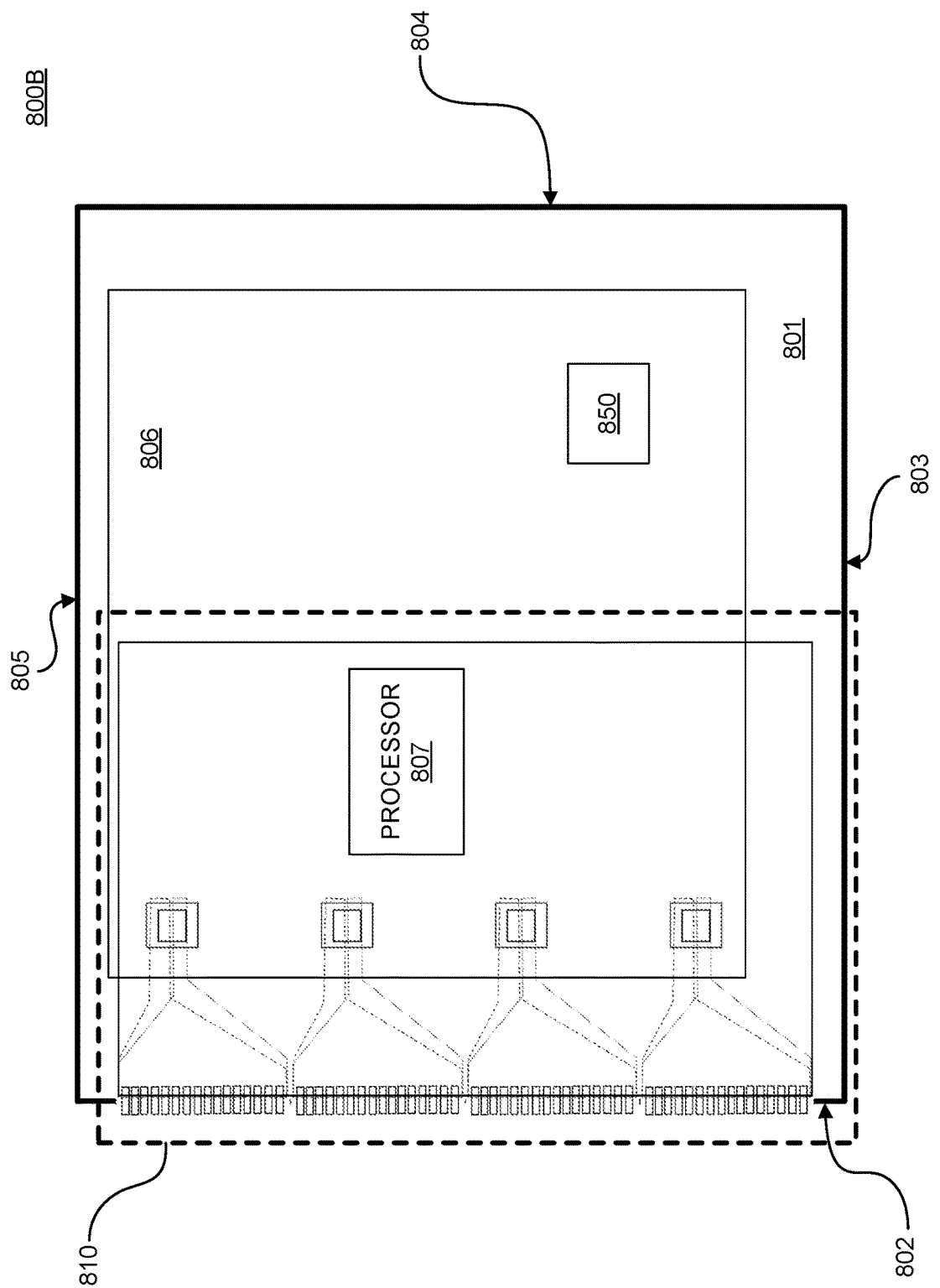
FIG. 8B is another example device in accordance with embodiments of the technology disclosed herein.

One of the benefits of implementing the GaaP technology disclosed herein is that the system can be large or small depending on a given implementation of the platform. FIG. 8B illustrates another example device 800B in accordance with embodiments of the technology disclosed herein. The device 800B can be similar to the device 800A discussed with respect to FIG. 8B, and all similar references should be interpreted as referring to similar components. As shown in FIG. 8B, the device 800B comprises a single GaaP assembly 810, wherein the processor 807 can comprise the ASIC for the device 800B, and the GaaP assembly 810 can be disposed on a system board 806 of the device 800B. Although illustrated as including four optical dies and a single ASIC 807, in other embodiments the GaaP assembly 810 can comprise a single optical die and a single ASIC, or a combination of multiple optical dies and ASICs 807. In this way, the size of the device 800B can be scaled as required to meet network requirements. In various embodiments, a management controller 850 may be disposed on the system board 806 to provide other electronic components for operation of device 800B, such as but not limited to EEPROMs, power regulators, among others.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. An optical interface assembly, comprising: a co-packaged assembly comprising one or more opto-electronic devices and one or more electronic components; a plurality of glass plates coupled to the co-packaged assembly, each of the plurality of glass plates comprising: one or more waveguides disposed therein; one or more connector ends configured to opto-mechanically couple to one or more optical cable connectors; and one or more optical vias disposed therein, at least one optical via configured to optically couple light to and/or from at least one of the one or more waveguides of the one of the plurality of glass plates; wherein a portion of at least one glass plate is positioned beneath another of the glass plates of the plurality of glass plates, and at least one glass plate of the plurality of glass plates is configured to connect to a top surface of a system board of a computing device.

2. The optical interface assembly of claim 1, wherein the co-packaged assembly comprises:
a photonics die comprising the one or more optical components;
an electronics die comprising the one or more electronic components; and
an electronic substrate, the photonics die and the electronics die being disposed on a top surface of the electronic substrate, wherein the electronic substrate comprises one or more optical openings, at least one of optical opening associated with each of the one or more opto-electronic devices.

3. The optical interface assembly of claim 2, wherein the plurality of glass plates comprises a first glass plate and a second glass plate, the optical interface assembly further comprising: the connector end of the first glass plate positioned above the connector end of the second glass plate; and the electronic substrate disposed above the first glass plate and the second glass plate.

4. The optical assembly of claim 3, wherein the electronic substrate is coupled to a top surface of the first glass plate, and a bottom surface of the first glass plate is coupled to a top surface of the second glass plate.

5. The optical assembly of claim 4, further comprising:
the first glass plate comprising one or more upper-plate optical vias, each upper-plate optical via having at least one waveguide of the one or more waveguides disposed in the first glass plate terminate therein;
each upper-plate optical via extending from a top surface of the first glass plate to a depth corresponding to the at least one waveguide terminating therein;
a directional mirror disposed in each of the one or more upper-plate optical vias and configured to couple light to and/or from the at least one waveguide and at least one opto-electronic device of the co-packaged assembly through an associated optical opening of the electronic substrate.

6. The optical assembly of claim 4, further comprising one or more pass-through optical vias disposed in the first glass plate, each pass-through optical via extending from the top surface of the first glass plate to the bottom surface of the first glass plate and configured to enable at least one waveguide disposed in the second glass plate to optical couple with at least one opto-electronic device of the co-packaged assembly.

7. The optical assembly of claim 4, the first glass plate comprising one or more pass-through optical vias, each pass-through optical vias extending from the top surface of the first glass plate to the bottom surface of the first glass plate, and aligned with an optical via disposed in the second glass plate and an optical opening of the electronic substrate.

8. The optical interface assembly of claim 3, wherein the electronic substrate is coupled to a top surface of a system interface peninsula of the first glass plate and a top surface of a system interface peninsula of the second glass plate.

9. The optical interface assembly of claim 8, further comprising:
a plurality of co-packaged assemblies;
the first glass plate comprises a plurality of system interface peninsulas;
the second glass plate comprises a plurality of system interface peninsulas;
each co-packaged assembly being disposed on one of the plurality of system interface peninsulas of the first glass plate and one of the plurality of system interface peninsulas of the second glass plate.

10. The optical interface assembly of claim 8, wherein the first glass plate and the second glass plate each comprise a bend, wherein the bend in the first glass plate is positioned between the system interface peninsula and one or more connector ends of the first glass plate and the bend in the second glass plate is positioned between the system interface peninsula and one or more connector ends of the second glass plate.

11. The optical interface assembly of claim 10, wherein a structural spacer is disposed between the bottom surface of the first glass plate and the top surface of the second glass.

12. The optical interface assembly of claim 1, further comprising a support structure configured to secure the optical interface assembly to one or more of a chassis of the computing device, a faceplate of the computing device, and the system board of the computing device.

* * * * *